(12) United States Patent
Ohkuma

(10) Patent No.: US 7,440,696 B2
(45) Date of Patent: Oct. 21, 2008

(54) DATA MULTIPLEXING NETWORK, WAVELENGTH MULTIPLEXER, AND DATA MULTIPLEXING TRANSMISSION METHOD

(75) Inventor: Takahiro Ohkuma, Tokyo (JP)

(73) Assignee: NEC Corporation (JP)

( * ) Notice: Subject to any disclaimer, the term of this patent is extended or adjusted under 35 U.S.C. 154(b) by 703 days.

(21) Appl. No.: 10/644,914

(22) Filed: Aug. 21, 2003

(65) Prior Publication Data

US 2004/0037330 A1 Feb. 26, 2004

(30) Foreign Application Priority Data

Aug. 21, 2002 (JP) ............................. 2002-240994

(51) Int. Cl.
*H04J 14/00* (2006.01)
*H04J 14/02* (2006.01)
*H04L 12/56* (2006.01)

(52) U.S. Cl. ............................. 398/51; 398/54; 398/79; 370/395.21; 370/395.42

(58) Field of Classification Search ............. 398/79–97, 398/51, 54; 370/395.21, 395.42, 395.43
See application file for complete search history.

(56) References Cited

U.S. PATENT DOCUMENTS 7,106,967 B2 * 9/2006 Handelman .................. 398/47

2004/0006613 A1 * 1/2004 Lemieux et al. ............. 709/223

FOREIGN PATENT DOCUMENTS

| JP | 2000-101584 | 4/2000 |
|----|----|----|
| WO | WO-01/31819 | 5/2001 |
| WO | WO-01/093480 | 12/2001 |

OTHER PUBLICATIONS

"Exploitation of DWDM for optical packet switching with quality of service guarantees"; Callegati et al.; Selected Areas in Communications, IEEE Journal on; vol. 20, Issue 1, Jan. 2002; pp. 190-201.*

"Distributed wavelength assignment protocols with priority for WDM all-optical networks"; Peng et al.; Computer Communications and Networks 2000, Proceedings, Ninth International Conference on; Oct. 16-18, 2000; pp. 625-630.*

* cited by examiner

*Primary Examiner*—Jason Chan
*Assistant Examiner*—Nathan M Curs
(74) *Attorney, Agent, or Firm*—Dickstein, Shapiro, LLP.

(57) ABSTRACT

In a data multiplexing network system, a first wavelength multiplexing function unit sets a plurality of different wavelengths which correspond to a plurality of different service classes, respectively, and maps each packet into each correspondent-wavelength which corresponds to each service class, to which the each packet belongs, and multiplexes the correspondent-wavelengths for the plurality of different service classes for a data transmission at a multiplexed-wavelength through a wavelength division multiplexing network. A second wavelength multiplexing function unit receives the each correspondent-wavelength and fetches a packet from the each correspondent-wavelength.

25 Claims, 13 Drawing Sheets

FIG. 3

| input port number | identifier |
|---|---|
| port 13-1 | best effort class |
| port 13-2 | perfect band guarantee class |
| port 13-3 | best effort class |

FIG. 4

| input port number | identifier |
|---|---|
| port 23-1 | best effort class |
| port 23-2 | best effort class |
| port 23-3 | perfect band guarantee class |

FIG. 5

| identifier | output port number |
|---|---|
| D11 | port 13-1 |
| D12 | port 13-2 |
| D13 | port 13-3 |

FIG. 6

| identifier | output port number |
|---|---|
| D21 | port 23-1 |
| D22 | port 23-2 |
| D23 | port 23-3 |

FIG. 7

| identifier | wavelength |
|---|---|
| best effort class | $\lambda 1$ |
| perfect band guarantee class | $\lambda 2$ |

FIG. 10

| input port information | packet header | identifier |
|---|---|---|
| port 13-1 | (A) | perfect band guarantee class |
| port 13-1 | (B) | best effort class |
| port 13-2 | (B) | best effort class |
| port 13-3 | (A) | perfect band guarantee class |

FIG. 11

| input port information | packet header | identifier |
|---|---|---|
| port 23-2 | (A) | perfect band guarantee class |
| port 23-2 | (B) | best effort class |
| port 23-1 | (B) | best effort class |
| port 23-3 | (A) | perfect band guarantee class |

FIG. 12

| packet header | output port number |
|---|---|
| header of packet "s" | port 13-1 |
| header of packet "t" | port 13-1 |
| header of packet "u" | port 13-2 |
| header of packet "v" | port 13-3 |

FIG. 13

| packet header | output port number |
|---|---|
| header of packet "s" | port 23-2 |
| header of packet "t" | port 23-2 |
| header of packet "u" | port 23-1 |
| header of packet "v" | port 23-3 |

DATA MULTIPLEXING NETWORK, WAVELENGTH MULTIPLEXER, AND DATA MULTIPLEXING TRANSMISSION METHOD

BACKGROUND OF THE INVENTION

1. Field of the Invention

The present invention relates to a data multiplexing network, a wavelength multiplexer and a data multiplexing transmission method, and more particularly to a data multiplexing network, a wavelength multiplexer and a data multiplexing transmission method for transmitting and receiving a plurality of packets through a single fiber.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

In accordance with the state of the art for transmitting a plurality of packets over a communication network, data are entered into a plurality of ports of a data multiplexer and then subjected to a timing division multiplexing into a single wavelength data signal which is then transmitted through a single fiber. A communication service provider sets guarantee/non-guarantee classes or service classes in quality of service (QoS) for providing communication services through the communication network.

The service classes includes a band-guarantee service class which guarantees the quality of service in a predetermined limited wavelength band and a best effort service class which does not guarantee the quality of service. The communication service provider provides communication services to subscribers in accordance with the designated service class. A variety of improvements has been proposed for the packet transmission techniques in accordance with the designated service class.

Japanese laid-open patent publication No. 2001-197110 discloses one example of the conventional techniques for traffic control to guarantee the quality of service according to each service class. In accordance with this conventional traffic control method, a Differentiated Service (Diffserv) is made through an interface of a router which constitutes an IP network. In this Differentiated Service, PQ is made to the guarantee class service (EF class) for realizing a reduced delay and a reduced jitter, while WFQ (Weigfted fair queuing) is made to the best effort class service (AF class) to prevent any undesired influence to the guarantee class service (EF class), thereby to further improve fairness and band-utilization factor, resulting in realization of distributed priority services without band-guarantee. This realizes concurrently both services in accordance with the band-guarantee service class (EF class) and the best effort service class (AF class).

The above-described conventional traffic control method has the following disadvantages. An output from a device executing the traffic control such as a traffic controller or a router is a time-division-multiplexed signal, for which reason all of the IP packets are transmitted at a single wavelength.

All the packets to be transmitted are mapped in a single wavelength. This allows an undesired interference between respective service classes.

Further, the time-division-multiplexed signal with a single wavelength as outputted from the traffic controller is then transmitted through a single fiber. This means that increasing the band of the service classes needs increasing the number of fibers.

Japanese laid-open patent publication No. 10-164083 discloses another conventional technique of setting an end-to-end transmission path for data transmission through a network. This conventional method of setting the end-to-end transmission path is concerned with how to select any one of two networks with different service classes; for example, a guarantee network and a best effort network. This publication does not disclose nor teach any measures of transmission of plural packets through the single fiber in the data multiplex system.

In the above circumstances, the development of novel data multiplexing network, wavelength multiplexer and data multiplexing transmission method free from the above problems is desirable.

SUMMARY OF TIE INVENTION

Accordingly, it is an object of the present invention to provide a novel data multiplexing network free from the above problems.

It is a further object of the present invention to provide a novel data multiplexing network allowing an increase in bands of service classes without increasing the number of network fibers and also preventing any interference between plural service classes.

It is a still further object of the present invention to provide a novel wavelength multiplexer free from the above problems.

It is yet a further object of the present invention to provide a novel wavelength multiplexer allowing an increase in bands of service classes without increasing the number of network fibers and also preventing any interference between plural service classes.

It is further more object of the present invention to provide a novel data multiplexing transmission method free from the above problems.

It moreover object of the present invention to provide a novel data multiplexing transmission method allowing an increase in bands of service classes without increasing the number of network fibers and also preventing any interference between plural service classes.

The present invention provides a data multiplexing network system including: a wavelength division multiplexing network; a first wavelength multiplexing function unit for setting a plurality of different wavelengths which correspond to a plurality of different service classes, respectively, and for mapping each packet into each correspondent-wavelength which corresponds to each service class, to which the each packet belongs, and for multiplexing the correspondent-wavelengths for the plurality of different service classes for a data transmission at a multiplexed-wavelength through the wavelength division multiplexing network; and a second wavelength multiplexing function unit for receiving the each correspondent-wavelength and for fetching a packet from the each correspondent-wavelength.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIG. 3 is a view illustrative of an example of service classes set on the up-side identifier table included in the identifier table retrieval unit included in the data multiplexing network shown in FIG. 1.

FIG. 4 is a view illustrative of an example of service classes set on the up-side identifier table included in the identifier table retrieval unit included in the data multiplexing network shown in FIG. 1.

FIG. 5 is a view illustrative of correspondences between identifiers and output port numbers stored on the up-side or down-side identifier table included in the identifier table retrieval unit included in the wavelength multiplexer shown in FIG. 1.

FIG. 6 is a view illustrative of correspondences between identifiers and output port numbers stored on the up-side or down-side identifier table included in the identifier table retrieval unit included in the wavelength multiplexer shown in FIG. 1.

FIG. 7 is a view illustrative of correspondences between identifiers and wavelengths, wherein the identifiers designate service classes.

FIG. 10 is a view illustrative of an example of service classes set on the up-side identifier table 15-1 included in the identifier table retrieval unit 15 included in the data multiplexing network 1 shown in FIG. 8.

FIG. 11 is a view illustrative of an example of service classes set on the up-side identifier table included in the identifier table retrieval unit included in the data multiplexing network 1 shown in FIG. 8.

FIG. 12 is a view illustrative of correspondences between packet headers and output port numbers stored on the down-side identifier table included in the identifier table retrieval unit included in the wavelength multiplexer shown in FIG. 8.

FIG. 13 is a view illustrative of correspondences between packet headers and output port numbers stored on the down-side identifier table included in the identifier table retrieval unit included in the wavelength multiplexer shown in FIG. 8.

DETAILED DESCRIPTION OF THE PREFERRED EMBODIMENTS

Figure 1:
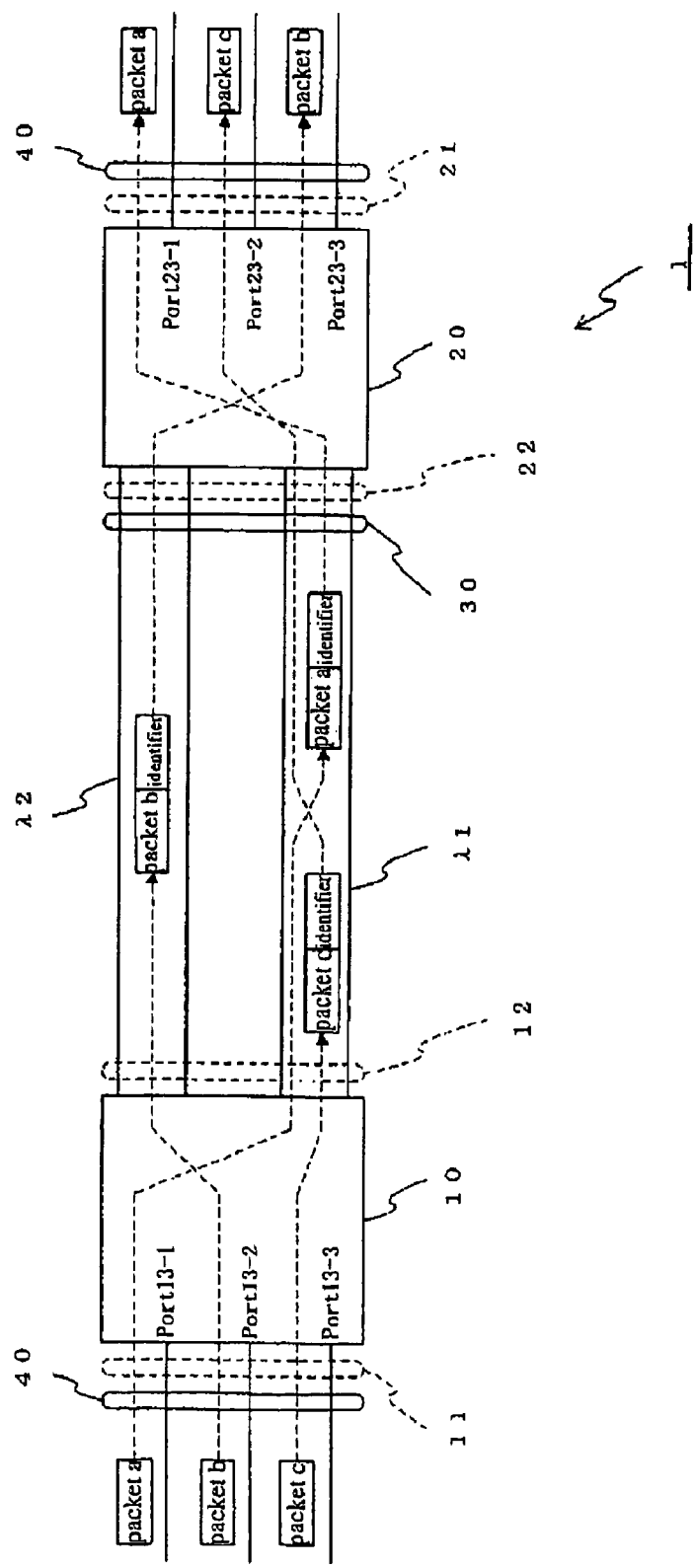
FIG. 1 is a block diagram illustrative of a configuration of a data multiplexing network in a first embodiment in accordance with the present invention.

A first aspect of the present invention is a data multiplexing network system including: a wavelength division multiplexing network; a first wavelength multiplexing function unit for setting a plurality of different wavelengths which correspond to a plurality of different service classes, respectively, and for mapping each packet into each correspondent-wavelength which corresponds to each service class, to which the each packet belongs, and for multiplexing the correspondent-wavelengths for the plurality of different service classes for a data transmission at a multiplexed-wavelength through the wavelength division multiplexing network; and a second wavelength multiplexing function unit for receiving the each correspondent-wavelength and for fetching a packet from the each correspondent-wavelength.

It is possible that the first wavelength multiplexing function unit further includes: a plurality of ports for receiving a plurality of packets; a first packet interface unit for receiving the plurality of packets from the plurality of ports; a first service class specifying unit for receiving the plurality of packets from the first packet interface unit and for specifying each service class, to which each of the plurality of packets belongs; a first wavelength mapping unit for receiving the plurality of packets from the first service class specifying unit and for mapping each of the plurality of packets at each correspondent-wavelength which corresponds to the each service class; and a first wavelength division multiplexing network interface for receiving the correspondent-wavelengths from the first wavelength mapping unit and for multiplexing the correspondent-wavelengths.

It is further possible that the second wavelength multiplexing function unit further includes: a second wavelength division multiplexing network interface for demultiplexing a multiplexed wavelength transmitted through the wavelength division multiplexing network into the correspondent-wavelengths; a second wavelength mapping unit for receiving the correspondent-wavelengths from the second wavelength division multiplexing network interface and for fetching the packets from the correspondent-wavelengths; a second service class specifying unit for receiving the packets from the second wavelength mapping unit and for specifying each output port for each of the packets, and for adding each output port information to the each packet; and a second packet interface unit for receiving the each packet with the each output port information and for sending the each packet to identified one of the plurality of ports, identified by the each output port information.

It is also possible that the first service class specifying unit adds the each output port information to the each packet, and the second service class specifying unit also specifies the each output port based on the each output port information of the each packet.

It is also possible that the second service class specifying unit also specifies the each output port based on each packet specifying information included in the each packet.

It is further possible that the each packet specifying information comprises a packet header included in the each packet.

It is also possible that the first packet interface unit adds each input port information to each of the plurality of packets as received from the plurality of ports, and the each input port information identifying each port, through which the each packet has been received, and the first service class specifying unit further includes: a first service class-correspondent table for defining correspondences between the service classes and the plurality of ports, and the first service class specifying unit makes a retrieval with reference to the first service class-correspondent table, based on the each input port information, so as to specify, as the each service class, each service class corresponding to each port identified by the each input port information.

It is also possible that each of the plurality of packets has a packet identifying information which identifies the each packet, and the first service class specifying unit further includes: a second service class-correspondent table for defining correspondences between the service classes and the packet identifying informations, and the first service class specifying unit makes a retrieval with reference to the second service class-correspondent table, based on the each packet identifying information, so as to specify, as the each service class, each service class corresponding to the each packet identifying information.

It is also possible that the plurality of different service classes include a best effort class and a perfect band guarantee class.

It is also possible that at least one of the first and second wavelength multiplexing function units further includes a shaper for controlling packet traffics in a plurality of wavelength bands.

A second aspect of the present invention is a wavelength multiplexer including: a first wavelength multiplexing function unit for setting a plurality of different wavelengths which correspond to a plurality of different service classes, respectively, and for mapping each packet into each correspondent-wavelength which corresponds to each service class, to which the each packet belongs, and for multiplexing the correspondent-wavelengths for the plurality of different service classes for a data transmission at a multiplexed-wavelength through the wavelength division multiplexing network.

It is possible that the first wavelength multiplexing function unit further includes: a plurality of ports for receiving a plurality of packets; a first packet interface unit for receiving the plurality of packets from the plurality of ports; a first service class specifying unit for receiving the plurality of packets from the first packet interface unit and for specifying each service class, to which each of the plurality of packets belongs; a first wavelength mapping unit for receiving the plurality of packets from the first service class specifying unit and for mapping each of the plurality of packets at each correspondent-wavelength which corresponds to the each service class; and a first wavelength division multiplexing network interface for receiving the correspondent-wavelengths from the first wavelength mapping unit and for multiplexing the correspondent-wavelengths.

It is also possible to further include a second wavelength multiplexing function unit for receiving the each correspondent-wavelength and for fetching a packet from the each correspondent-wavelength.

It is also possible that the second wavelength multiplexing function unit further includes: a second wavelength division multiplexing network interface for demultiplexing a multiplexed wavelength transmitted through the wavelength division multiplexing network into the correspondent-wavelengths; a second wavelength mapping unit for receiving the correspondent-wavelengths from the second wavelength division multiplexing network interface and for fetching the packets from the correspondent-wavelengths; a second service class specifying unit for receiving the packets from the second wavelength mapping unit and for specifying each output port for each of the packets, and for adding each output port information to the each packet; and a second packet interface unit for receiving the each packet with the each output port information and for sending the each packet to identified one of the plurality of ports, identified by the each output port information.

It is also possible that the first service class specifying unit adds the each output port information to the each packet, and the second service class specifying unit also specifies the each output port based on the each output port information of the each packet.

It is also possible that the second service class specifying unit also specifies the each output port based on each packet specifying information included in the each packet.

It is also possible that the each packet specifying information comprises a packet header included in the each packet.

It is also possible that the first packet interface unit adds each input port information to each of the plurality of packets as received from the plurality of ports, and the each input port information identifying each port, through which the each packet has been received, and the first service class specifying unit further includes a first service class-correspondent table for defining correspondences between the service classes and the plurality of ports, and the first service class specifying unit makes a retrieval with reference to the first service class-correspondent table, based on the each input port information, so as to specify, as the each service class, each service class corresponding to each port identified by the each input port information.

It is also possible that each of the plurality of packets has a packet identifying information which identifies the each packet, and the first service class specifying unit further includes: a second service class-correspondent table for defining correspondences between the service classes and the packet identifying informations, and the first service class specifying unit makes a retrieval with reference to the second service class-correspondent table, based on the each packet identifying information, so as to specify, as the each service class, each service class corresponding to the each packet identifying information.

It is also possible that the plurality of different service classes include a best effort class and a perfect band guarantee class.

It is also possible that at least one of the first and second wavelength multiplexing function units further includes a shaper for controlling packet traffics in a plurality of wavelength bands.

A third aspect of the present invention is a data multiplexing transmission method including: setting a plurality of different wavelengths which correspond to a plurality of different service classes, respectively mapping each packet into each correspondent-wavelength which corresponds to each service class, to which the each packet belongs; and multiplexing the correspondent-wavelengths for the plurality of different service classes for a data transmission at a multiplexed-wavelength through the wavelength division multiplexing network.

It is also possible that to further include the steps of: receiving the each correspondent-wavelength; and fetching a packet from the each correspondent-wavelength.

It is also possible to further include the steps of: demultiplexing a multiplexed wavelength transmitted through the wavelength division multiplexing network into the correspondent-wavelengths for fetching the packets from the correspondent-wavelengths; specifying each output port for each of the packets; adding each output port information to the each packet; and sending the each packet to identified one of the plurality of ports, identified by the each output port information.

It is also possible that the each output port information is added to the each packet, and the each output port is specified based on the each output port information of the each packet.

It is also possible that the each output port is also specified based on each packet specifying information included in the each packet.

It is also possible that the each packet specifying information comprises a packet header included in the each packet.

It is also possible that each input port information is added to each of the plurality of packets as received from the plurality of ports, and the each input port information identifies each port, through which the each packet has been received, and a retrieval is made with reference to a first service class-correspondent table for defining correspondences between the service classes and the plurality of ports, based on the each input port information, so as to specify, as the each service class, each service class corresponding to each port identified by the each input port information.

It is also possible that each of the plurality of packets has a packet identifying information which identifies the each packet, and a retrieval is made with reference to a second service class-correspondent table defining correspondences between the service classes and the packet identifying informations, based on the each packet identifying information, so as to specify, as the each service class, each service class corresponding to the each packet identifying information.

It is also possible that the plurality of different service classes include a best effort class and a perfect band guarantee class.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

First Embodiment

A first embodiment according to the present invention will be described in detail with reference to the drawings. FIG. 1 is a block diagram illustrative of a configuration of a data multiplexing network in a first embodiment in accordance with the present invention.

A data multiplexing network 1 includes wavelength multiplexers 10 and 20 and a wavelength division multiplexing network (WDM network) 30. The wavelength multiplexers 10 and 20 are coupled to each other through the wavelength division multiplexing network (WDM network) 30.

The wavelength multiplexer 10 has a packet interface 11 and a wavelength division multiplexing network interface (WDM network interface) 12. The wavelength multiplexer 10 is coupled through the packet interface 11 to a general line 40 which transmits each packet. The wavelength multiplexer 10 receives packets "a", "b" and "c" through the packet interface 11 from the general line 40. The wavelength multiplexer 10 also transmits the packets "a", "b" and "c" through the packet interface 11 to the general line 40. The wavelength multiplexer 10 is also coupled through the wavelength division multiplexing network interface (WDM network interface) 12 to the wavelength division multiplexing network (WDM network) 30. The wavelength multiplexer 10 receives a wavelength-multiplexed signal through the wavelength division multiplexing network interface (WDM network interface) 12 from the wavelength division multiplexing network (WDM network) 30. The wavelength multiplexer 10 also transmits a wavelength-multiplexed signal through the wavelength division multiplexing network interface (WDM network interface) 12 from the wavelength division multiplexing network (WDM network) 30.

The wavelength multiplexer 20 has a packet interface 21 and a wavelength division multiplexing network interface (WDM network interface) 22. The wavelength multiplexer 20 is coupled through the packet interface 21 to another general line 40 which transmits each packet. The wavelength multiplexer 20 receives packets "a", "b" and "c" through the packet interface 21 from the general line 40. The wavelength multiplexer 20 also transmits the packets "a", "b" and "c" through the packet interface 21 to the general line 40. The wavelength multiplexer 20 is also coupled through the wavelength division multiplexing network interface (WDM network interface) 22 to the wavelength division multiplexing network (WDM network) 30. The wavelength multiplexer 20 receives a wavelength-multiplexed signal through the wavelength division multiplexing network interface (WDM network interface) 22 from the wavelength division multiplexing network (WDM network) 30. The wavelength multiplexer 20 also transmits a wavelength-multiplexed signal through the wavelength division multiplexing network interface (WDM network interface) 22 from the wavelength division multiplexing network (WDM network) 30.

Figure 2:
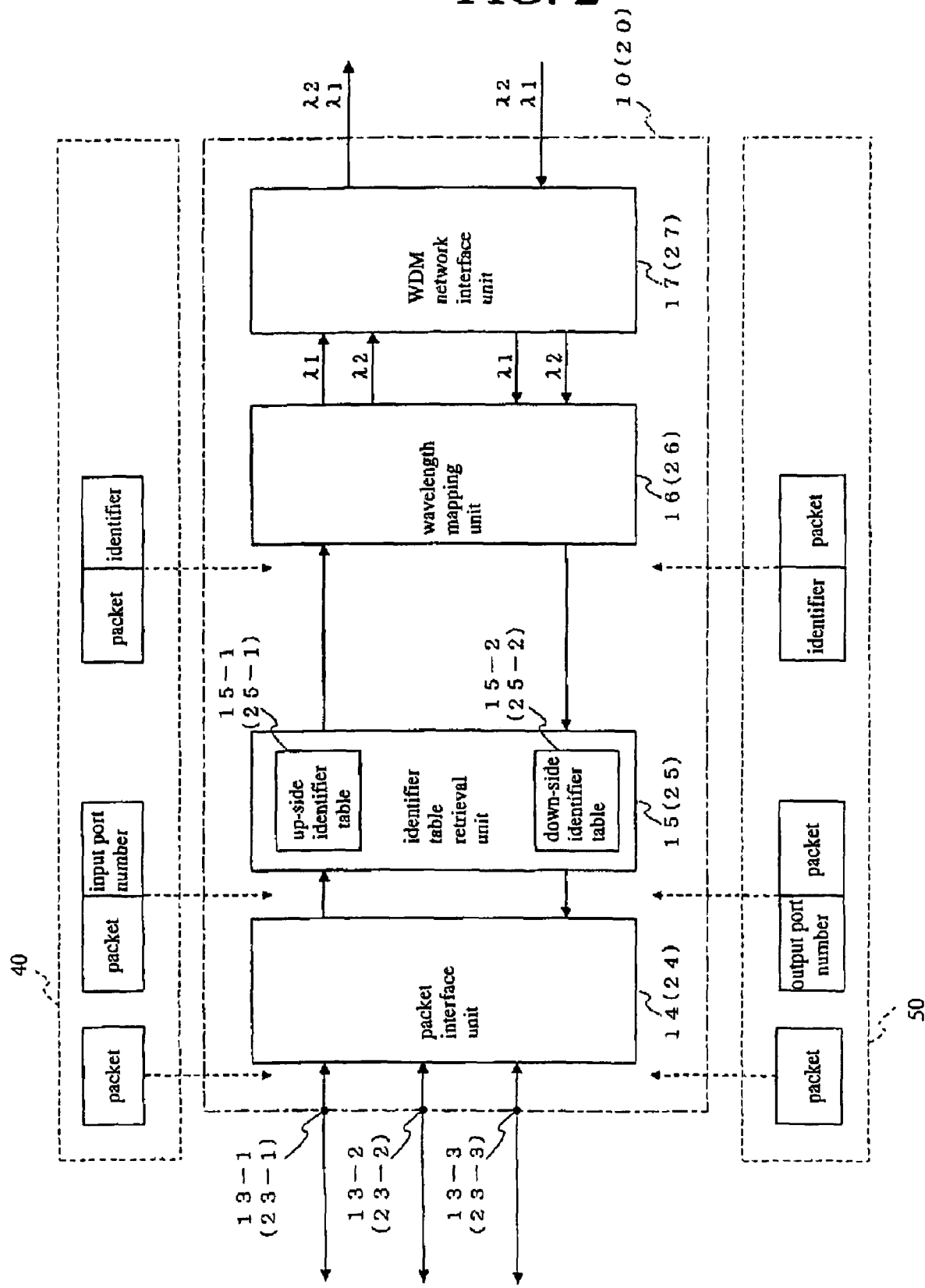
FIG. 2 is a block diagram illustrative of a configuration of each of the wavelength multiplexers included in the data multiplexing network shown in FIG. 1.

FIG. 2 is a block diagram illustrative of a configuration of each of the wavelength multiplexers 10 and 20 included in the data multiplexing network 1 shown in FIG. 1. The wavelength multiplexer 10 includes a plurality of ports 13-1, 13-2 and 13-3, a packet interface unit 14, an identifier table retrieval unit 15 acting as a service class specifying unit, a wavelength mapping unit 16, and a wavelength division multiplexing network interface unit (WDM network interface unit) 17.

The wavelength multiplexer 20 also includes a plurality of ports 23-1, 23-2 and 23-3, a packet interface unit 24, an identifier table retrieval unit 25 acting as a service class specifying unit, a wavelength mapping unit 26, and a wavelength division multiplexing network interface unit (WDM network interface unit) 27.

Each of the ports 13-1, 13-2 and 13-3 receives the packet from the packet interface 11 and sends the received packet to the packet interface unit 14. Each of the ports 13-1, 13-2 and 13-3 also receives the packet from the packet interface unit 14 and sends the received packet to the packet interface 11. In this embodiment, the wavelength multiplexer 10 has three ports. It is unnecessary to limit the number of the ports into three. It is, of course, possible that the number of the ports may be 1, 2, 4 or more. The port 13-1 transmits and receives the packet "a" to and from the general line 40 through the packet interface 11. The port 13-2 transmits and receives the packet "b" to and from the general line 40 through the packet interface 11. The port 13-3 transmits and receives the packet "c" to and from the general line 40 through the packet interface 11.

A service class, to which the packet "a" belongs, is set in the port 13-1, wherein the port 13-1 has received the packet "a" through the packet interface 11, and setting the service class is made by an up-side identifier table 15-1 included in the identifier table retrieval unit 15. Another service class, to which the packet "b" belongs, is set in the port 13-2, wherein the port 13-2 has received the packet "b" through the packet interface 11, and setting the service class is made by the up-side identifier table 15-1 included in the identifier table retrieval unit 15. Still another service class, to which the packet "c" belongs, is set in the port 13-3, wherein the port 13-3 has received the packet "c" through the packet interface 11, and setting the service class is made by the up-side identifier table 15-1 included in the identifier table retrieval unit 15. This allows the wavelength multiplexer 10 to specify the service classes, to which the packets "a", "b" and "c" belong.

Each of the ports 23-1, 23-2 and 23-3 receives the packet from the packet interface 21 and sends the received packet to the packet interface unit 24. Each of the ports 23-1, 23-2 and 23-3 also receives the packet from the packet interface unit 24 and sends the received packet to the packet interface 21. In this embodiment, the wavelength multiplexer 20 has three ports. It is unnecessary to limit the number of the ports into three. It is, of course, possible that the number of the ports may be 1, 2, 4 or more. The port 23-1 transmits and receives the packet "a" to and from the general line 40 through the packet interface 21. The port 23-2 transmits and receives the packet "b" to and from the general line 40 through the packet interface 21. The port 23-3 transmits and receives the packet "c" to and from the general line 40 through the packet interface 21.

A service class, to which the packet "a" belongs, is set in the port 23-1, wherein the port 23-1 has received the packet "a" through the packet interface 21, and setting the service class is made by an up-side identifier table 25-1 included in the identifier table retrieval unit 25. Another service class, to which the packet "b" belongs, is set in the port 23-2, wherein the port 23-2 has received the packet "b" through the packet interface 21, and setting the service class is made by the up-side identifier table 25-1 included in the identifier table retrieval unit 25. Still another service class, to which the packet "c" belongs, is set in the port 23-3, wherein the port 23-3 has received the packet "c" through the packet interface 21, and setting the service class is made by the up-side identifier table 25-1 included in the identifier table retrieval unit 25. This allows the wavelength multiplexer 20 to specify the service classes, to which the packets "a", "b" and "c" belong.

The packet interface unit 14 receives the packets "a", "b" and "c" from the ports 13-1, 13-2 and 13-3 and provide input port informations to the received packets "a", "b" and "c" before the packet interface unit 14 sends the packets "a", "b" and "c" with the input port informations to the identifier table retrieval unit 15. A packet format 40 illustrates that the packet interface unit 14 or 24 provides the packet with an input port information before the packet is sent to the identifier table retrieval unit 15 or 25. The input port information may comprise an input port number which designates the port which has received the subject packet. For example, the packet interface unit 14 provides the packet "a" with an input port information which designates the port 13-1. The packet interface unit 14 also provides the packet "b" with an input port information which designates the port 13-2. The packet interface unit 14 also provides the packet "c" with an input port information which designates the port 13-3. The packet interface unit 24 provides the packet "a" with an input port information which designates the port 23-1. The packet interface unit 24 also provides the packet "b" with an input port information which designates the port 23-3. The packet interface unit 24 also provides the packet "c" with an input port information which designates the port 23-2.

The packet interface unit 24 receives the packets "a", "b" and "c" from the ports 23-1, 23-2 and 23-3 and provide input port informations to the received packets "a", "b" and "c" before the packet interface unit 24 sends the packets "a", "b" and "c" with the input port informations to the identifier table retrieval unit 25. A packet format 40 illustrates that the packet interface unit 24 provides the packet with an input port information before the packet is sent to the identifier table retrieval unit 25. The input port information may comprise an input port number which designates the port which has received the subject packet. For example, the packet interface unit 24 provides the packet "a" with an input port information which designates the port 23-1. The packet interface unit 24 also provides the packet "b" with an input port information which designates the port 23-2. The packet interface unit 24 also provides the packet "c" with an input port information which designates the port 23-3.

The packet interface 14 also receives the packets "a", "b" and "c" from the identifier table retrieval unit 15, wherein the packets "a", "b" and "c" are accompanied with respective output port informations provided by the identifier table retrieval unit 15. The packet interface 14 sends each packet to designated one of the ports 13-1, 13-2 and 13-3 based on the output port information which designates one port, to which the packet is to be sent. The output port information may comprise a port number which designates the port, to which the packet is to be sent.

The packet interface 24 also receives the packets "a", "b" and "c" from the identifier table retrieval unit 25, wherein the packets "a", "b" and "c" are accompanied with respective output port informations provided by the identifier table retrieval unit 25. The packet interface 24 sends each packet to designated one of the ports 23-1, 23-2 and 23-3 based on the output port information which designates one port, to which the packet is to be sent. The output port information may comprise a port number which designates the port, to which the packet is to be sent.

The identifier table retrieval unit 15 receives the packets "a", "b" and "c" with the input port informations from the packet interface unit 14, and makes a retrieval with reference to the up-side identifier table 15-1 acting as an up-side service class specifying table, based on the input port informations accompanied to the packets "a", "b" and "c". Respective service classes corresponding to plural input port numbers are set on the up-side identifier table 15-1, wherein the service class comprises an identifier. FIG. 3 is a view illustrative of an example of service classes set on the up-side identifier table 15-1 included in the identifier table retrieval unit 15 included in the data multiplexing network 1 shown in FIG. 1. The up-side identifier table 15-1 stores the best effort class to the port 13-1, a perfect band guarantee class to the port 13-2 and the best effort class to the port 13-3.

The identifier table retrieval unit 25 receives the packets "a", "b" and "c" with the input port informations from the packet interface unit 24, and makes a retrieval with reference to the up-side identifier table 25-1 acting as an up-side service class specifying table, based on the input port informations accompanied to the packets "a", "b" and "c". Respective service classes corresponding to plural input port numbers are set on the up-side identifier table 25-1, wherein the service class comprises an identifier. FIG. 4 is a view illustrative of an example of service classes set on the up-side identifier table 25-1 included in the identifier table retrieval unit 15 included in the data multiplexing network 1 shown in FIG. 1. The up-side identifier table 25-1 stores the best effort class to the port 23-1, the best effort class to the port 23-2 and the perfect band guarantee class to the port 23-3.

The service classes are represented by the identifiers. Each identifier includes not only the service class but also an additional information which is utilized to specify the output port in the counterpart as a destination device of the wavelength multiplexers 10 and 20. For example, the service classes stored on the up-side identifier table 15-1 included in the identifier table retrieval unit 15 included in the wavelength multiplexer 10 includes the identifiers which identify the service classes to the input ports 13-1, 13-2 and 13-3 included in the wavelength multiplexer 10 but also the output port numbers which identify the output ports 23-1, 23-2 and 23-3 included in the wavelength multiplexer 20. The service classes stored on the up-side identifier table 25-1 included in the identifier table retrieval unit 25 included in the wavelength multiplexer 20 includes the identifiers which identify the service classes to the input ports 23-1, 23-2 and 23-3 included in the wavelength multiplexer 20 but also the output port numbers which identify the output ports 13-1, 13-2 and 13-3 included in the wavelength multiplexer 10.

FIG. 5 is a view illustrative of correspondences between identifiers and output port numbers stored on the up-side identifier table 25-1 included in the identifier table retrieval unit 25 included in the wavelength multiplexer 20 shown in FIG. 1. An identifier D11 stored on the up-side identifier table 25-1 included in the identifier table retrieval unit 25 included in the wavelength multiplexer 20 includes an output port number "Port 13-1" which identifies the port 13-1 included in the wavelength multiplexer 10. An identifier D12 stored on the up-side identifier table 25-1 included in the identifier table retrieval unit 25 included in the wavelength multiplexer 20 includes an output port number "Port 13-2" which identifies the port 13-2 included in the wavelength multiplexer 10. An identifier D13 stored on the up-side identifier table 25-1 included in the identifier table retrieval unit 25 included in the wavelength multiplexer 20 includes an output port number "Port 13-3" which identifies the port 13-3 included in the wavelength multiplexer 10.

FIG. 6 is a view illustrative of correspondences between identifiers and output port numbers stored on the up-side identifier table 15-1 included in the identifier table retrieval unit 15 included in the wavelength multiplexer 10 shown in FIG. 1. An identifier D21 stored on the up-side identifier table 15-1 included in the identifier table retrieval unit 15 included in the wavelength multiplexer 10 includes an output port number "Port 23-1" which identifies the port 23-1 included in the wavelength multiplexer 20. An identifier D22 stored on the up-side identifier table 15-1 included in the identifier table retrieval unit 15 included in the wavelength multiplexer 10 includes an output port number "Port 23-2" which identifies the port 23-2 included in the wavelength multiplexer 20. An identifier D23 stored on the up-side identifier table 15-1 included in the identifier table retrieval unit 15 included in the wavelength multiplexer 10 includes an output port number "Port 23-3" which identifies the port 23-3 included in the wavelength multiplexer 20.

Those identifiers may comprise labels of Multiprotocol Label Switching. As shown in FIG. 2, the identifier is attached to a head of the packet. The position of the packet, to which the identifier is attached, is not limited. It is, of course, possible that the identifier is attached to any positions of the packet.

The identifier table retrieval unit 15 makes a retrieval with reference to the up-side identifier table 15-1 by use of the input port information as a retrieval key in order to obtain an identifier which is unique in the wavelength division multiplexing network (WDM network) 30. The identifier table retrieval unit 15 further deletes or removes the input port information from the packet and in place adds the obtained unique identifier to the packet before the identifier table retrieval unit 15 sends the packet with the identifier to the wavelength mapping unit 16. The packet format comprises the packet and the identifier for transmission from the identifier table retrieval unit 15 to the wavelength mapping unit 16.

The identifier table retrieval unit 25 makes a retrieval with reference to the up-side identifier table 25-1 by use of the input port information as a retrieval key in order to obtain an identifier which is unique in the wavelength division multiplexing network (WDM network) 30. The identifier table retrieval unit 25 further deletes or remove the input port information from the packet and in place add the obtained unique identifier to the packet before the identifier table retrieval unit 25 sends the packet with the identifier to the wavelength mapping unit 26. The packet format comprises the packet and the identifier for transmission from the identifier table retrieval unit 25 to the wavelength mapping unit 26.

The identifier table retrieval unit 15 receives the packets "a", "b" and "c" with the identifiers from the wavelength mapping unit 16, and then the identifier table retrieval unit 15 makes a retrieval with reference to a down-side identifier table 15-2 specifying a down-side service class, by use of the identifiers accompanied to the received packets "a", "b" and "c" as retrieval keys, whereby the identifier table retrieval unit 15 obtains output port informations which include output port numbers from the down-side identifier table 15-2. The identifier table retrieval unit 15 further deletes or removes the identifiers from the packets "a", "b" and "c" and in place add the obtained input port informations to the packets "a", "b" and "c" before the identifier table retrieval unit 15 sends the packets "a", "b" and "c" with the input port informations to the packet interface unit 14.

The identifier table retrieval unit 25 receives the packets "a", "b" and "c" with the identifiers from the wavelength mapping unit 26, and then the identifier table retrieval unit 25 makes a retrieval with reference to a down-side identifier table 25-2 specifying a down-side service class, by use of the identifiers accompanied to the received packets "a", "b" and "C" as retrieval keys, whereby the identifier table retrieval unit 25 obtains output port informations which include output port numbers from the down-side identifier table 25-2. The identifier table retrieval unit 25 further deletes or removes the identifiers from the packets "a", "b" and "c" and in place add the obtained input port informations to the packets "a", "b" and "c" before the identifier table retrieval unit 25 sends the packets "a", "b" and "c" with the input port informations to the packet interface unit 24.

As shown in FIG. 5, an identifier D11 stored on the down-side identifier table 15-2 included in the identifier table retrieval unit 15 included in the wavelength multiplexer 10 includes an output port number "Port 13-1" which identifies the port 13-1 included in the wavelength multiplexer 10. An identifier D12 stored on the down-side identifier table 15-2 included in the identifier table retrieval unit 15 included in the wavelength multiplexer 10 includes an output port number "Port 13-2" which identifies the port 13-2 included in the wavelength multiplexer 10. An identifier D13 stored on the down-side identifier table 15-2 included in the identifier table retrieval unit 15 included in the wavelength multiplexer 10 includes an output port number "Port 13-3" which identifies the port 13-3 included in the wavelength multiplexer 10.

As shown in FIG. 6, an identifier D21 stored on the down-side identifier table 25-2 included in the identifier table retrieval unit 25 included in the wavelength multiplexer 20 includes an output port number "Port 23-1" which identifies the port 23-1 included in the wavelength multiplexer 20. An identifier D22 stored on the down-side identifier table 25-2 included in the identifier table retrieval unit 25 included in the wavelength multiplexer 20 includes an output port number "Port 23-2" which identifies the port 23-2 included in the wavelength multiplexer 20. An identifier D23 stored on the down-side identifier table 25-2 included in the identifier table retrieval unit 25 included in the wavelength multiplexer 20 includes an output port number "Port 23-3" which identifies the port 23-3 included in the wavelength multiplexer 20.

A packet format 50 illustrates that the identifier table retrieval unit 15 or 25 provides the packet with an input port information before the packet is sent to the packet interface unit 14 or 24. The input port information may comprise an input port number which designates the port which has received the subject packet. For example, the identifier table retrieval unit 15 provides the packet "a" with an input port information which designates the port 13-1. The identifier table retrieval unit 15 also provides the packet "b" with an input port information which designates the port 13-2. The identifier table retrieval unit 15 also provides the packet "c" with an input port information which designates the port 13-3. The identifier table retrieval unit 25 provides the packet "a" with an input port information which designates the port 23-1. The identifier table retrieval unit 25 also provides the packet "b" with an input port information which designates the port 23-2. The identifier table retrieval unit 25 also provides the packet "c" with an input port information which designates the port 23-3.

The wavelength mapping unit 16 receives the packets "a", "b" and "c" with the identifiers from the identifier table retrieval unit 15, and then the wavelength mapping unit 16 decides a wavelength to be mapped, based on each of the identifiers accompanied to the received packets "a", "b" and "c", so that the wavelength mapping unit 16 maps the packets "a", "b" and "c" into the decided wavelengths "λ1" and "λ2". The wavelength mapping unit 16 sends the mapped wavelengths "λ1" and "λ2" to the wavelength division multiplexing network interface unit (WDM network interface unit) 17. For example, the first wavelength "λ1" corresponds to the packets "a" and "c" with the identifier which identifies the best effort class, while the second wavelength "λ2" corresponds to the packet "b" with the identifier which identifies the perfect band guarantee class.

The wavelength mapping unit 26 receives the packets "a", "b" and "c" with the identifiers from the identifier table retrieval unit 25, and then the wavelength mapping unit 26 decides a wavelength to be mapped, based on each of the identifiers accompanied to the received packets "a", "b" and "c", so that the wavelength mapping unit 26 maps the packets "a", "b" and "c" into the decided wavelengths "λ1" and "λ2". The wavelength mapping unit 26 sends the mapped wavelengths "λ1" and "λ2" to the wavelength division multiplexing network interface unit (WDM network interface unit) 27. For example, the first wavelength "λ1" corresponds to the packets "a" and "c" with the identifier which identifies the best effort class, while the second wavelength "λ2" corresponds to the packet "b" with the identifier which identifies the perfect band guarantee class.

FIG. 7 is a view illustrative of correspondences between identifiers and wavelengths, wherein the identifiers designate service classes. The identifier designating the service class corresponds to the wavelength. For example, the identifier designating the best effort class corresponds to a first wavelength "λ1". The identifier designating the perfect band guarantee class corresponds to a second wavelength "λ2".

The wavelength mapping unit 16 also receives the mapped wavelengths "λ1" and "λ2" from the wavelength division multiplexing network interface unit (WDM network interface unit) 17, and then the wavelength mapping unit 16 fetches the packets "a", "b" and "c" from the received wavelengths "λ1" and "λ2". The wavelength mapping unit 16 adds the identifiers to the fetched packets "a", "b" and "c" and sends the fetched packets "a", "b" and "c" with the identifiers to the identifier table retrieval unit 15 as shown in the packet format 50 of FIG. 2.

The wavelength mapping unit 26 also receives the mapped wavelengths "λ1" and "λ2" from the wavelength division multiplexing network interface unit (WDM network interface unit) 27, and then the wavelength mapping unit 26 fetches the packets "a", "b" and "c" from the received wavelengths "λ1" and "λ2". The wavelength mapping unit 26 adds the identifiers to the fetched packets "a", "b" and "c" and sends the fetched packets "a", "b" and "c" with the identifiers to the identifier table retrieval unit 25 as shown in the packet format 50 of FIG. 2.

The wavelength division multiplexing network interface unit (WDM network interface unit) 17 receives the mapped wavelengths "λ1" and "λ2" from the wavelength mapping unit 16, and then multiplexes the mapped wavelengths "λ1" and "λ2" into a single wavelength. The wavelength division multiplexing network interface unit (WDM network interface unit) 17 sends the multiplexed single wavelength through the wavelength division multiplexing network interface (WDM network interface) 12 to the wavelength division multiplexing network (WDM network) 30. For example, the first wavelength "λ1" corresponds to the packets "a" and "c" with the identifier which identifies the best effort class, while the second wavelength "λ2" corresponds to the packet "b" with the identifier which identifies the perfect band guarantee class.

The wavelength division multiplexing network interface unit (WDM network interface unit) 27 receives the mapped wavelengths "λ1" and "λ2" from the wavelength mapping unit 26, and then multiplexes the mapped wavelengths "λ1" and "λ2" into a single wavelength. The wavelength division multiplexing network interface unit (WDM network interface unit) 27 sends the multiplexed single wavelength through the wavelength division multiplexing network interface (WDM network interface) 22 to the wavelength division multiplexing network (WDM network) 30. For example, the first wavelength "λ1" corresponds to the packets "a" and "c" with the identifier which identifies the best effort class, while the second wavelength "λ2" corresponds to the packet "b" with the identifier which identifies the perfect band guarantee class.

The wavelength division multiplexing network interface unit (WDM network interface unit) 17 receives the multiplexed wavelength through the wavelength division multiplexing network interface (WDM network interface) 12 from the wavelength division multiplexing network (WDM network) 30. The wavelength division multiplexing network interface unit (WDM network interface unit) 17 demultiplexes the multiplexed wavelength into the first and second wavelengths "λ1" and "λ2". The wavelength division multiplexing network interface unit (WDM network interface unit) 17 sends the demultiplexed first and second wavelengths "λ1" and "λ2" to the wavelength mapping unit 16. For example, the first wavelength "λ1" corresponds to the packets "a" and "c" with the identifier which identifies the best effort class, while the second wavelength "λ2" corresponds to the packet "b" with the identifier which identifies the perfect band guarantee class.

The wavelength division multiplexing network interface unit (WDM network interface unit) 27 receives the multiplexed wavelength through the wavelength division multiplexing network interface (WDM network interface) 22 from the wavelength division multiplexing network (WDM network) 30. The wavelength division multiplexing network interface unit (WDM network interface unit) 27 demultiplexes the multiplexed wavelength into the first and second wavelengths "λ1" and "λ2". The wavelength division multiplexing network interface unit (WDM network interface unit) 27 sends the demultiplexed first and second wavelengths "λ1" and "λ2" to the wavelength mapping unit 26. For example, the first wavelength "λ1" corresponds to the packets "a" and "c" with the identifier which identifies the best effort class, while the second wavelength "λ2" corresponds to the packet "b" with the identifier which identifies the perfect band guarantee class.

As described above with reference to FIG. 2, the wavelength multiplexer 10 includes a first wavelength multiplexing function block for processing the up-side packets for transmission through the wavelength division multiplexing network (WDM network) 30 to the wavelength multiplexer 20, and a second wavelength multiplexing function block for processing the down-side packets as received through the wavelength division multiplexing network (WDM network) 30 from the wavelength multiplexer 20.

As described above with reference to FIG. 2, the wavelength multiplexer 20 includes a first wavelength multiplexing function block for processing the up-side packets for transmission through the wavelength division multiplexing network (WDM network) 30 to the wavelength multiplexer 10, and a second wavelength multiplexing function block for processing the down-side packets as received through the wavelength division multiplexing network (WDM network) 30 from the wavelength multiplexer 10.

The first wavelength multiplexing function block of the wavelength multiplexer 10 includes a plurality of ports 13-1, 13-2 and 13-3 for receiving the packets "a", "b" and "c" respectively, an up-side packet interface sub-unit included in the packet interface unit 14 for receiving the packets "a", "b" and "c" from the plurality of ports 13-1, 13-2 and 13-3, an up-side identifier table retrieval sub-unit including the up-side identifier table 15-1 and being included in the identifier table retrieval unit 15 for specifying or designating the service classes, to which the received packets "a", "b" and "c" belong respectively, an up-side wavelength mapping sub-unit included in the wavelength mapping unit 16 for mapping the packets "a", "b" and "c" into the wavelengths which correspond to the service classes specified or designated by the up-side identifier table retrieval sub-unit, and an up-side wavelength division multiplexing network interface sub-unit included in the wavelength division multiplexing network interface unit (WDM network interface unit) 17 for multiplexing the wavelengths mapped by the up-side wavelength mapping sub-unit.

The second wavelength multiplexing function block of the wavelength multiplexer 10 includes a down-side wavelength division multiplexing network interface sub-unit included in the wavelength division multiplexing network interface unit (WDM network interface unit) 17 for demultiplexing the multiplexed wavelength received through the wavelength division multiplexing network interface (WDM network interface) 12 from the wavelength division multiplexing network (WDM network) 30, a down-side wavelength mapping sub-unit included in the wavelength mapping unit 16 for receiving the demultiplexed wavelengths from the down-side wavelength division multiplexing network interface sub-unit and for fetching the packets "a", "b" and "c" from the received wavelengths, a down-side identifier table retrieval sub-unit including the down-side identifier table 15-1 and being included in the identifier table retrieval unit 15 for specifying or designating output ports, from which the received packets are to be outputted, a down-side packet interface sub-unit included in the packet interface unit 14 for receiving the packets "a", "b" and "c" from the down-side identifier table retrieval sub-unit and transmitting the packets "a", "b" and "c" to the plurality of ports 13-1, 13-2 and 13-3, and the plurality of ports 13-1, 13-2 and 13-3 for receiving the packets "a", "b" and "c" from the packet interface unit 14 and outputting the packets "a", "b" and "c".

The first wavelength multiplexing function block of the wavelength multiplexer 20 includes a plurality of ports 23-1, 23-2 and 23-3 for receiving the packets "a", "b" and "c" respectively, an up-side packet interface sub-unit included in the packet interface unit 24 for receiving the packets "a", "b" and "c" from the plurality of ports 23-1, 23-2 and 23-3, an up-side identifier table retrieval sub-unit including the up-side identifier table 25-1 and being included in the identifier table retrieval unit 25 for specifying or designating the service classes, to which the received packets "a", "b" and "c" belong respectively, an up-side wavelength mapping sub-unit included in the wavelength mapping unit 26 for mapping the packets "a", "b" and "c" into the wavelengths which correspond to the service classes specified or designated by the up-side identifier table retrieval sub-unit, and an up-side wavelength division multiplexing network interface sub-unit included in the wavelength division multiplexing network interface unit (WDM network interface unit) 27 for multiplexing the wavelengths mapped by the up-side wavelength mapping sub-unit.

The second wavelength multiplexing function block of the wavelength multiplexer 20 includes a down-side wavelength division multiplexing network interface sub-unit included in the wavelength division multiplexing network interface unit (WDM network interface unit) 27 for demultiplexing the multiplexed wavelength received through the wavelength division multiplexing network interface (WDM network interface) 22 from the wavelength division multiplexing network (WDM network) 30, a down-side wavelength mapping sub-unit included in the wavelength mapping unit 26 for receiving the demultiplexed wavelengths from the down-side wavelength division multiplexing network interface sub-unit and for fetching the packets "a", "b" and "c" from the received wavelengths, a down-side identifier table retrieval sub-unit including the down-side identifier table 25-1 and being included in the identifier table retrieval unit 25 for specifying or designating output ports, from which the received packets are to be outputted, a down-side packet interface sub-unit included in the packet interface unit 24 for receiving the packets "a", "b" and "c" from the down-side identifier table retrieval sub-unit and transmitting the packets "a", "b" and "c" to the plurality of ports 23-1, 23-2 and 23-3, and the plurality of ports 23-1, 23-2 and 23-3 for receiving the packets "a", "b" and "c" from the packet interface unit 24 and outputting the packets "a", "b" and "c".

The wavelength division multiplexing network (WDM network) 30 comprises a single optical fiber cable for data transmissions at plural different wavelengths through the wavelength division multiplexing, wherein the multiplexed wavelength is transmitted through the single optical fiber. The wavelength division multiplexing network (WDM network) 30 includes physically independent two paths for the first wavelength "$\lambda 1$" corresponding to the best effort class and the second wavelength "$\lambda 2$" corresponding to the perfect band guarantee class. The best effort class does not guarantee the quality of service. The perfect band guarantee class guarantees the quality of service.

The following descriptions will focus on operations of the data multiplexing network 1 with reference again to FIGS. 1 and 2.

First, the transmission operation of the data multiplexing network 1 for data transmission through the wavelength division multiplexing network (WDM network) 30 will be described prior to the descriptions of the receiving operation of the data multiplexing network 1.

Respective service classes, to which the packets "a", "b" and "c" belong, with correspondences to the ports 13-1, 13-2 and 13-3 are stored on the up-side identifier table 15-1 included in the identifier table retrieval unit 15 as shown in FIG. 3. Respective output port numbers with the identifiers are stored on the down-side identifier table 15-2 included in the identifier table retrieval unit 15 as shown in FIG. 5. Respective wavelengths "$\lambda 1$" and "$\lambda 2$" with correspondences to the respective service classes are predetermined as shown in FIG. 7. The packets "a" and "c" received at the ports 13-1 and 13-3 belong to the best effort class, while the packet "b" received at the port 13-2 belongs to the perfect band guarantee class. The first wavelength "$\lambda 1$" is allocated to the best effort class, while the second wavelength "$\lambda 2$" is allocated to the perfect band guarantee class.

Respective service classes, to which the packets "a", "b" and "C" belong, with correspondences to the ports 23-1, 23-2 and 23-3 are stored on the up-side identifier table 25-1 included in the identifier table retrieval unit 25 as shown in FIG. 4. Respective output port numbers with the identifiers are stored on the down-side identifier table 25-2 included in the identifier table retrieval unit 25 as shown in FIG. 6. Respective wavelengths "λ1" and "λ2" with correspondences to the respective service classes are predetermined as shown in FIG. 7. The packets "a" and "c" received at the ports 23-1 and 23-3 belong to the best effort class, while the packet "b" received at the port 23-2 belongs to the perfect band guarantee class. The first wavelength "λ1" is allocated to the best effort class, while the second wavelength "λ2" is allocated to the perfect band guarantee class.

The ports 13-1, 13-2 and 13-3 receive the packets "a", "b" and "c" respectively which have been transmitted through the packet interface 11, and then transmits the received packets "a", ""b" and "c" to the packet interface unit 14.

The ports 23-1, 23-2 and 23-3 receive the packets "a", "b" and "c" respectively which have been transmitted through the packet interface 21, and then transmits the received packets "a", "b" and "c" to the packet interface unit 24.

The packet interface unit 14 adds the input port informations to the received packets "a", "b" and "c", wherein the input port informations identify the ports 13-1, 13-2 and 13-3, at which the packets "a", "b" and "c" have been received. The packet interface unit 14 sends the packets "a", "b" and "c" with the input port informations to the identifier table retrieval unit 15. The packet "a" is accompanied with the input port information identifying the port 13-1. The packet "b" is accompanied with the input port information identifying the port 13-2. The packet "c" is accompanied with the input port information identifying the port 13-3.

The packet interface unit 24 adds the input port informations to the received packets "a", "b" and "c", wherein the input port informations identify the ports 23-1, 23-2 and 23-3, at which the packets "a", "b" and "c" have been received. The packet interface unit 24 sends the packets "a", "b" and "c" with the input port informations to the identifier table retrieval unit 25. The packet "a" is accompanied with the input port information identifying the port 23-1. The packet "b" is accompanied with the input port information identifying the port 23-2. The packet "c" is accompanied with the input port information identifying the port 23-3.

The identifier table retrieval unit 15 receives the packets "a", "b" and "c" with the input port informations, and fetches the input port informations from the packets "a", "b" and "c". The identifier table retrieval unit 15 makes a retrieval with reference to the up-side identifier table 15-1 by use of the fetched input port informations as retrieval keys, and obtains the identifiers corresponding to the fetched input port informations from the up-side identifier table 15-1. The identifier table retrieval unit 15 deletes and removes the input port informations from the packets "a", "b" and "c", and in place adds the retrieved identifiers to the packets "a", "b" and "c". The identifier table retrieval unit 15 sends the packets "a", ""b" and "C" with the retrieved identifiers to the wavelength mapping unit 16. The up-side identifier table 15-1 defines that the best effort class corresponds to the ports 13-1 and 13-3, while the perfect band guarantee class corresponds to the port 13-2. The packets "a" and "c" received at the ports 13-1 and 133 are accompanied with the identifier which identifies the best effort class, while the packet "b" received at the port 13-2 is accompanied with the identifier which identifies the perfect band guarantee class.

The identifier table retrieval unit 25 receives the packets "a", "b" and "c" with the input port informations, and fetches the input port informations from the packets "a", "b" and "c". The identifier table retrieval unit 25 makes a retrieval with reference to the up-side identifier table 25-1 by use of the fetched input port informations as retrieval keys, and obtains the identifiers corresponding to the fetched input port informations from the up-side identifier table 25-1. The identifier table retrieval unit 25 deletes and removes the input port informations from the packets "a", "b" and "c", and in place adds the retrieved identifiers to the packets "a", "b" and "c". The identifier table retrieval unit 25 sends the packets "a", "b" and "c" with the retrieved identifiers to the wavelength mapping unit 26. The up-side identifier table 25-1 defines that the best effort class corresponds to the ports 23-1 and 23-3, while the perfect band guarantee class corresponds to the port 23-2. The packets "a" and "c" received at the ports 23-1 and 233 are accompanied with the identifier which identifies the best effort class, while the packet "b" received at the port 23-2 is accompanied with the identifier which identifies the perfect band guarantee class.

The wavelength mapping unit 16 receives the packets "a", "b" and "c" with the retrieved identifiers, and fetches the retrieved identifiers from the packets "a", "b" and "c", and decides respective service classes based on the retrieved identifiers. The wavelength mapping unit 16 maps the packets "a", "b" and "c" into the wavelengths corresponding to the decided service classes. Since the packets "a" and "c" are accompanied with the identifier which identifies the best effort class, then the wavelength mapping unit 16 maps the packets "a" and "c" to the first wavelength "λ1" which corresponds to the best effort class. Since the packet "b" is accompanied with the identifier which identifies the perfect band guarantee class, then the wavelength mapping unit 16 maps the packet "b" to the second wavelength "λ2" which corresponds to the perfect band guarantee class. The wavelength mapping unit 16 sends the mapped first and second wavelengths "λ1" and "λ2" to the wavelength division multiplexing network interface unit (WDM network interface unit) 17.

The wavelength mapping unit 26 receives the packets "a", "b" and "c" with the retrieved identifiers, and fetches the retrieved identifiers from the packets "a", "b" and "c", and decides respective service classes based on the retrieved identifiers. The wavelength mapping unit 26 maps the packets "a", "b" and "c" into the wavelengths corresponding to the decided service classes. Since the packets "a" and "c" are accompanied with the identifier which identifies the best effort class, then the wavelength mapping unit 26 maps the packets "a" and "c" to the first wavelength "λ1" which corresponds to the best effort class. Since the packet "b" is accompanied with the identifier which identifies the perfect band guarantee class, then the wavelength mapping unit 26 maps the packet "b" to the second wavelength "λ2" which corresponds to the perfect band guarantee class. The wavelength mapping unit 26 sends the mapped first and second wavelengths "λ1" and "λ2" to the wavelength division multiplexing network interface unit (WDM network interface unit) 27.

The wavelength division multiplexing network interface unit (WDM network interface unit) 17 multiplexes the received first and second wavelengths "λ1" and "λ2" which correspond to the best effort class and the perfect band guarantee class, respectively. The wavelength division multiplexing network interface unit (WDM network interface unit) 17 transits the packets "a" and "c" at the first wavelength "λ1" corresponding to the best effort class, and the packet "b" at the second wavelength "λ2" corresponding to the perfect band guarantee class.

The wavelength division multiplexing network interface unit (WDM network interface unit) 27 multiplexes the received first and second wavelengths "λ1" and "λ2" which correspond to the best effort class and the perfect band guarantee class, respectively. The wavelength division multiplexing network interface unit (WDM network interface unit) 27 transits the packets "a" and "c" at the first wavelength "λ1" corresponding to the best effort class, and the packet "b" at the second wavelength "λ2" corresponding to the perfect band guarantee class.

The receiving operation of the data multiplexing network 1 will subsequently be described.

The wavelength division multiplexing network interface unit (WDM network interface unit) 17 receives the multiplexed wavelength through the wavelength division multiplexing network interface (WDM network interface) 12 from the wavelength division multiplexing network (WDM network) 30. The wavelength division multiplexing network interface unit (WDM network interface unit) 17 demultiplexes the multiplexed wavelength into the first and second wavelengths "λ1" and "λ2". The wavelength division multiplexing network interface unit (WDM network interface unit) 17 sends the first and second wavelengths "λ1" and "λ2" to the wavelength mapping unit 16.

The wavelength division multiplexing network interface unit (WDM network interface unit) 27 receives the multiplexed wavelength through the wavelength division multiplexing network interface (WDM network interface) 22 from the wavelength division multiplexing network (WDM network) 30. The wavelength division multiplexing network interface unit (WDM network interface unit) 27 demultiplexes the multiplexed wavelength into the first and second wavelengths "λ1" and "λ2". The wavelength division multiplexing network interface unit (WDM network interface unit) 27 sends the first and second wavelengths "λ1" and "λ2" to the wavelength mapping unit 26.

The wavelength mapping unit 16 receives the first and second wavelengths "λ1" and "λ2" and fetches the packets "a", "b" and "c" from the received first and second wavelengths "λ1" and "λ2". The wavelength mapping unit 16 adds the fetched packets "a", "b" and "c" with the identifies which, correspond to the first and second wavelengths "λ1" and "λ2" allocated to the best effort class and the perfect band guarantee class. The wavelength mapping unit 16 sends the packets "a", "b" and "c" with the identifies to the identifier table retrieval unit 15.

The wavelength mapping unit 26 receives the first and second wavelengths "λ1" and "λ2" and fetches the packets "a", "b" and "c" from the received first and second wavelengths "λ1" and "λ2". The wavelength mapping unit 26 adds the fetched packets "a", "b" and "c" with the identifies which, correspond to the first and second wavelengths "λ1" and "λ2" allocated to the best effort class and the perfect band guarantee class. The wavelength mapping unit 26 sends the packets "a", "b" and "c" with the identifies to the identifier table retrieval unit 25.

The identifier table retrieval unit 15 receives the packets "a", "b" and "c" with the identifies from the wavelength mapping unit 16, and fetches the identifiers from the packets "a", "b" and "c", so that the identifier table retrieval unit 15 makes a retrieval with reference to the down-side identifier table 15-2 by use of the fetched identifiers as retrieval keys, whereby the identifier table retrieval unit 15 obtains the output port informations from the down-side identifier table 15-2, wherein the output port informations identify the output ports, from which the packets "a", "b" and "c" will be outputted. The identifier table retrieval unit 15 deletes or removes the identifiers from the packets "a", "b" and "c", and in place adds the retrieved output port informations to the packets "a", "b" and "c". The identifier table retrieval unit 15 sends the packets "a", "b" and "c" with the retrieved output port informations to the packet interface unit 14.

The identifier table retrieval unit 25 receives the packets "a", "b" and "c" with the identifies from the wavelength mapping unit 26, and fetches the identifiers from the packets "a", "b" and "c", so that the identifier table retrieval unit 25 makes a retrieval with reference to the down-side identifier table 25-2 by use of the fetched identifiers as retrieval keys, whereby the identifier table retrieval unit 25 obtains the output port informations from the down-side identifier table 25-2, wherein the output port informations identify the output ports, from which the packets "a", "b" and "c" will be outputted. The identifier table retrieval unit 25 deletes or removes the identifiers from the packets "a", "b" and "C", and in place adds the retrieved output port informations to the packets "a", "b" and "c". The identifier table retrieval unit 25 sends the packets "a", "b" and "c" with the retrieved output port informations to the packet interface unit 24.

The down-side identifier table 15-2 included in the wavelength multiplexer 10 defines that the port 23-1 in the wavelength multiplexer 20 corresponds to the port 13-1 in the wavelength multiplexer 10, and the port 23-2 in the wavelength multiplexer 20 corresponds to the port 13-3 in the wavelength multiplexer 10, and the port 23-3 in the wavelength multiplexer 20 corresponds to the port 13-2 in the wavelength multiplexer 10.

The down-side identifier table 25-2 included in the wavelength multiplexer 20 defines that the port 13-1 in the wavelength multiplexer 10 corresponds to the port 23-1 in the wavelength multiplexer 20, and the port 13-2 in the wavelength multiplexer 10 corresponds to the port 23-3 in the wavelength multiplexer 20, and the port 13-3 in the wavelength multiplexer 10 corresponds to the port 23-2 in the wavelength multiplexer 20.

The identifier table retrieval unit 15 adds the output port information identifying the port 13-1 in the wavelength multiplexer 10 to the packet "a", from which the identifier identifying the port 23-1 in the wavelength multiplexer 20 has been removed. The identifier table retrieval unit 15 also adds the output port information identifying the port 13-3 in the wavelength multiplexer 10 to the packet "c", from which the identifier identifying the port 23-2 in the wavelength multiplexer 20 has been removed. The identifier table retrieval unit 15 also adds the output port information identifying the port 13-2 in the wavelength multiplexer 10 to the packet "b", from which the identifier identifying the port 23-3 in the wavelength multiplexer 20 has been removed.

The identifier table retrieval unit 25 adds the output port information identifying the port 23-1 in the wavelength multiplexer 20 to the packet "a", from which the identifier identifying the port 13-1 in the wavelength multiplexer 10 has been removed. The identifier table retrieval unit 25 also adds the output port information identifying the port 23-3 in the wavelength multiplexer 20 to the packet "b", from which the identifier identifying the port 13-2 in the wavelength multiplexer 10 has been removed. The identifier table retrieval unit 25 also adds the output port information identifying the port 23-2 in the wavelength multiplexer 20 to the packet "c", from which the identifier identifying the port 13-3 in the wavelength multiplexer 10 has been removed.

The packet interface unit 14 receives the packets "a", "b" and "c" with the output port informations from the identifier table retrieval unit 15, and fetches the output port informations from the packets "a", "b" and "C", so that the packet interface unit 14 sends the packets "a", "b" and "c" to the ports 13-1, 13-2 and 13-3 designated by the fetched output port informations. Since the packet "a" is accompanied with the output port information identifying the port 13-1, then the packet interface unit 14 sends the packet "a" to the port 13-1. Since the packet "b" is accompanied with the output port information identifying the port 13-2, then the packet interface unit 14 sends the packet "b" to the port 13-2. Since the packet "c" is accompanied with the output port information identifying the port 13-3, then the packet interface unit 14 sends the packet "c" to the port 13-3.

The packet interface unit 24 receives the packets "a", "b" and "C" with the output port informations from the identifier table retrieval unit 25, and fetches the output port informations from the packets "a", "b" and "c", so that the packet interface unit 24 sends the packets "a", "b" and "c" to the ports 23-1, 23-3 and 23-2 designated by the fetched output port informations. Since the packet "a" is accompanied with the output port information identifying the port 23-1, then the packet interface unit 24 sends the packet "a" to the port 23-1. Since the packet "b" is accompanied with the output port information identifying the port 23-3; then the packet interface unit 24 sends the packet "b" to the port 23-3. Since the packet "c" is accompanied with the output port information identifying the port 23-2, then the packet interface unit 24 sends the packet "c" to the port 23-2.

The packets "a", "b" and "c" received at the ports 13-1, 13-2 and 13-3 are further transmitted through the packet interface 11 to the general line 40. The packets "a", "b" and "c" received at the ports 23-1, 23-3 and 23-2 are further transmitted through the packet interface 21 to the general line 40.

In accordance with the novel data multiplexing network 1 of this embodiment, different wavelengths are allocated to every different plural service classes, to which plural packets belong, wherein the different wavelengths are multiplexed through the wavelength division multiplexing for transmissions through the wavelength division multiplexing network (WDM network) 30 which comprises a single optical fiber. Allocations of the different wavelengths to every different plural service classes prevent any substantive interference between the different service classes.

The wavelength division multiplexing of the different wavelengths allocated to every different plural service classes allows increasing the service class bands without increasing the number of the optical fibers.

Second Embodiment

Figure 8:
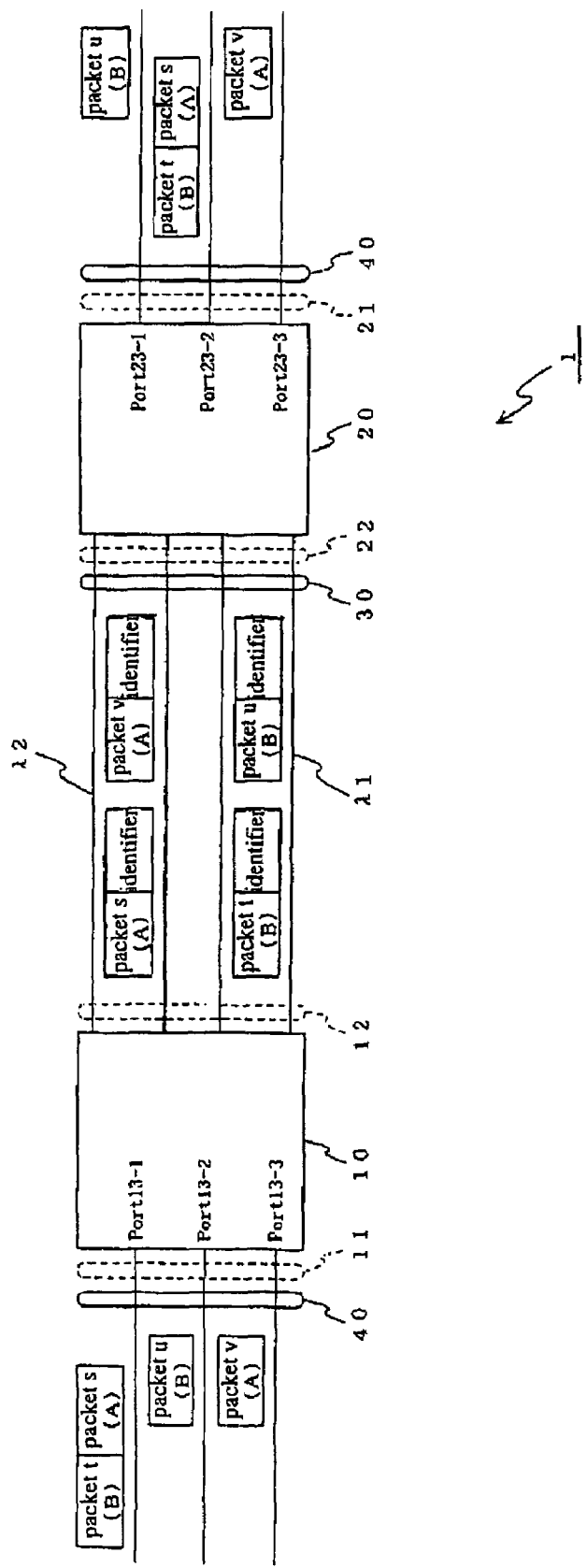
FIG. 8 is a block diagram illustrative of a configuration of a data multiplexing network in a second embodiment in accordance with the present invention.

A second embodiment according to the present invention will be described in detail with reference to the drawings. FIG. 8 is a block diagram illustrative of a configuration of a data multiplexing network in a second embodiment in accordance with the present invention. This second embodiment is different from the above-described first embodiment in view of the method of how to classifying the packets based on the service classes. In the above-described first embodiment, the service classes depend upon the input ports, to which the packets are inputted. In accordance with this second embodiment, the service classes depend upon the packets and are independent from the ports, to which the packets are inputted.

A data multiplexing network 1 includes wavelength multiplexers 10 and 20 and a wavelength division multiplexing network (WDM network) 30. The wavelength multiplexers 10 and 20 are coupled to each other through the wavelength division multiplexing network (WDM network) 30.

The wavelength multiplexer 10 has a packet interface 11 and a wavelength division multiplexing network interface (WDM network interface) 12. The wavelength multiplexer 10 is coupled through the packet interface 11 to a general line 40 which transmits each packet. The wavelength multiplexer 10 receives packets "s", "t, "u" and "v" through the packet interface 11 from the general line 40. The wavelength multiplexer 10 also transmits the packets "s", "t", "u" and "v" through the packet interface 11 to the general line 40. The wavelength multiplexer 10 is also coupled through the wavelength division multiplexing network interface (WDM network interface) 12 to the wavelength division multiplexing network (WDM network) 30. The wavelength multiplexer 10 receives a wavelength-multiplexed signal through the wavelength division multiplexing network interface (WDM network interface) 12 from the wavelength division multiplexing network (WDM network) 30. The wavelength multiplexer 10 also transmits a wavelength-multiplexed signal through the wavelength division multiplexing network interface (WDM network interface) 12 from the wavelength division multiplexing network (WDM network) 30.

The wavelength multiplexer 20 has a packet interface 21 and a wavelength division multiplexing network interface (WDM network interface) 22. The wavelength multiplexer 20 is coupled through the packet interface 21 to another general line 40 which transmits each packet. The wavelength multiplexer 20 receives packets "s", "t's, "U" and "v" through the packet interface 21 from the general line 40. The wavelength multiplexer 20 also transmits the packets "s", "t", "U" and "v" through the packet interface 21 to the general line 40. The wavelength multiplexer 20 is also coupled through the wavelength division multiplexing network interface (WDM network interface) 22 to the wavelength division multiplexing network (WDM network) 30. The wavelength multiplexer 20 receives a wavelength-multiplexed signal through the wavelength division multiplexing network interface (WDM network interface) 22 from the wavelength division multiplexing network (WDM network) 30. The wavelength multiplexer 20 also transmits a wavelength-multiplexed signal through the wavelength division multiplexing network interface (WDM network interface) 22 from the wavelength division multiplexing network (WDM network) 30.

Figure 9:
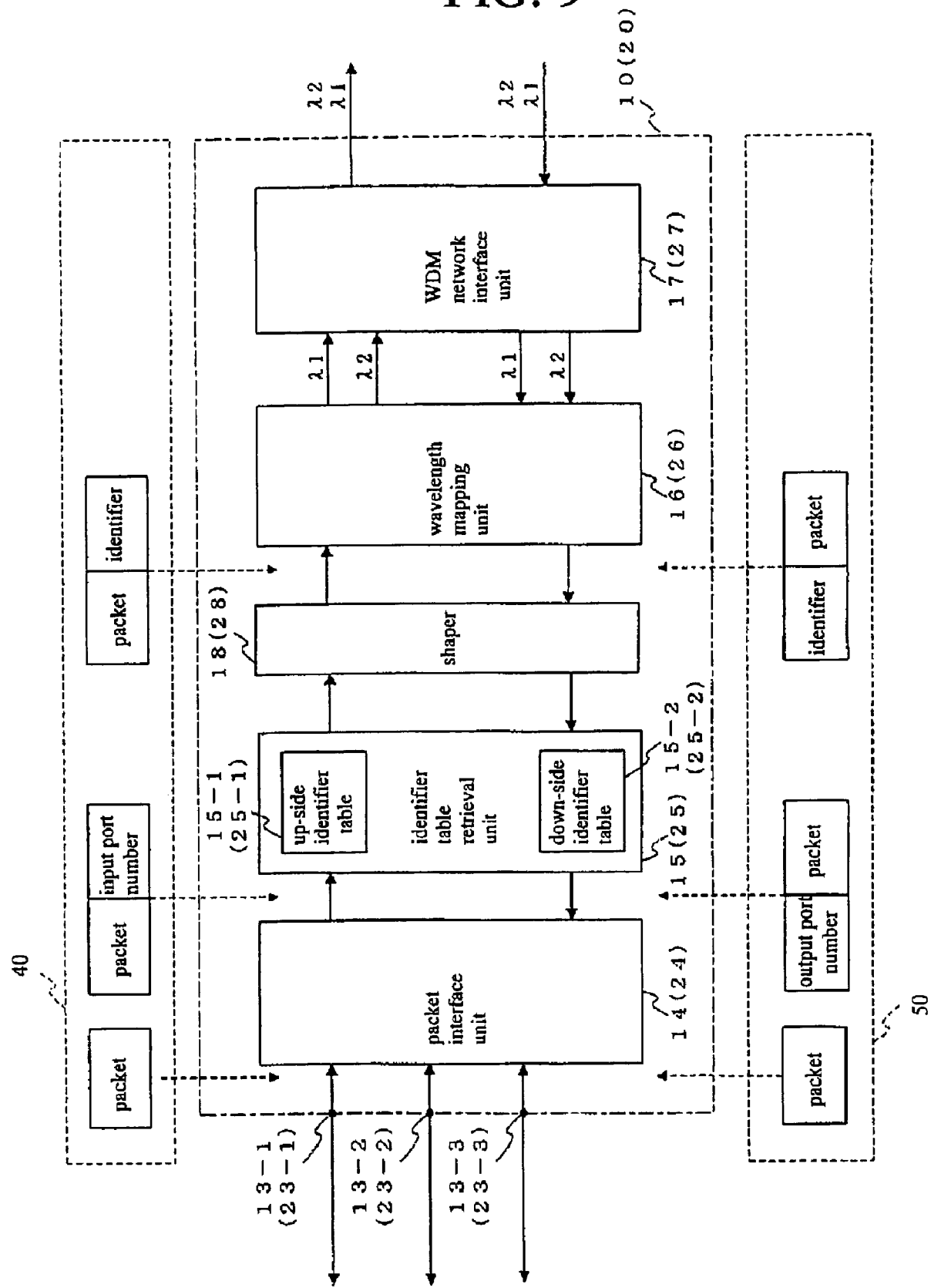
FIG. 9 is a block diagram illustrative of a configuration of each of the wavelength multiplexers included in the data multiplexing network shown in FIG. 8.

FIG. 9 is a block diagram illustrative of a configuration of each of the wavelength multiplexers 10 and 20 included in the data multiplexing network 1 shown in FIG. 8. The wavelength multiplexer 10 includes a plurality of ports 13-1, 13-2 and 13-3, a packet interface unit 14, an identifier table retrieval unit 15 acting as a service class specifying unit, a wavelength mapping unit 16, a wavelength division multiplexing network interface unit (WDM network interface unit) 17, and a shaper 18.

The wavelength multiplexer 20 also includes a plurality of ports 23-1, 23-2 and 23-3, a packet interface unit 24, an identifier table retrieval unit 25 acting as a service class specifying unit, a wavelength mapping unit 26, a wavelength division multiplexing network interface unit (WDM network interface unit) 27, and a shaper 28.

Each of the ports 13-1, 13-2 and 13-3 receives the packet from the packet interface 11 and sends the received packet to the packet interface unit 14. Each of the ports 13-1, 13-2 and 13-3 also receives the packet from the packet interface unit 14 and sends the received packet to the packet interface 11. In this embodiment, the wavelength multiplexer 10 has three ports. It is unnecessary to limit the number of the ports into three. It is, of course, possible that the number of the ports may be 1, 2, 4 or more. The port 13-1 transmits and receives the packets "t" and "s" to and from the general line 40 through the packet interface 11. The port 13-2 transmits and receives the packet "u" to and from the general line 40 through the packet interface 11. The port 13-3 transmits and receives the packet "v" to and from the general line 40 through the packet interface 11.

Each of the ports 23-1, 23-2 and 23-3 receives the packet from the packet interface 21 and sends the received packet to the packet interface unit 24. Each of the ports 23-1, 23-2 and 23-3 also receives the packet from the packet interface unit 24 and sends the received packet to the packet interface 21. In this embodiment, the wavelength multiplexer 20 has three ports. It is unnecessary to limit the number of the ports into three. It is, of course, possible that the number of the ports may be 1, 2, 4 or more. The port 23-1 transmits and receives the packets "t" and "s" to and from the general line 40 through the packet interface 21. The port 23-2 transmits and receives the packet "u" to and from the general line 40 through the packet interface 21. The port 23-3 transmits and receives the packet "v" to and from the general line 40 through the packet interface 21.

The packet interface unit 14 receives the packets "s", "t", "u" and "v" from the ports 13-1, 13-2 and 13-3 and provide input port informations to the received packets "s", "t", "u" and "v" before the packet interface unit 14 sends the packets "s", "t", "U" and "v" with the input port informations to the identifier table retrieval unit 15. A packet format 40 illustrates that the packet interface unit 14 or 24 provides the packet with an input port information before the packet is sent to the identifier table retrieval unit 15 or 25. The input port information may comprise an input port number which designates the port which has received the subject packet. For example, the packet interface unit 14 provides the packets "s" and "t" with an input port information which designates the port 13-1. The packet interface unit 14 also provides the packet "u" with an input port information which designates the port 13-2. The packet interface unit 14 also provides the packet "v" with an input port information which designates the port 133. The packet interface unit 24 also provides the packets "s" and "t" with an input port information which designates the port 23-1. The packet interface unit 24 also provides the packet "u" with an input port information which designates the port 23-2. The packet interface unit 24 also provides the packet "v" with an input port information which designates the port 23-3.

The packet interface unit 24 receives the packets "s", "t", "u" and "v" from the ports 23-1, 23-2 and 23-3 and provide input port informations to the received packets "s", "t", "u" and "v" before the packet interface unit 24 sends the packets "'s", "t", "u" and "v" with the input port informations to the identifier table retrieval unit 25. A packet format 40 illustrates that the packet interface unit 24 provides the packet with an input port information before the packet is sent to the identifier table retrieval unit 25. The input port information may comprise an input port number which designates the port which has received the subject packet. For example, the packet interface unit 24 provides the packets "s" and "t" with an input port information which designates the port 23-2. The packet interface unit 24 also provides the packet "u" with an input port information which designates the port 23-1. The packet interface unit 24 also provides the packet "v" with an input port information which designates the port 23-3.

The packet interface 14 also receives the packets "s", "t", "u" and "v" from the identifier table retrieval unit 15, wherein the packets "s", "t", "u" and "v" are accompanied with respective output port informations provided by the identifier table retrieval unit 15. The packet interface 14 sends each packet to designated one of the ports 13-1, 13-2 and 13-3 based on the output port information which designates one port, to which the packet is to be sent. The output port information may comprise a port number which designates the port, to which the packet is to be sent.

The packet interface 24 also receives the packets "s", "t", "u" and "v" from the identifier table retrieval unit 25, wherein the packets "s", "t", "u" and "v" are accompanied with respective output port informations provided by the identifier table retrieval unit 25. The packet interface 24 sends each packet to designated one of the ports 23-1, 23-2 and 23-3 based on the output port information which designates one port, to which the packet is to be sent. The output port information may comprise a port number which designates the port, to which the packet is to be sent.

The packets "s", "t", "u" and "v" are further accompanied with packet headers which identify packets itself. For example, the packet "s" is accompanied with the packet header (A) which identifies the perfect band guarantee class corresponding to the second wavelength "λ2". The packet "t" is accompanied with the packet header (B) which identifies the best effort class corresponding to the first wavelength "λ1". The packet "U" is accompanied with the packet header (B) which identifies the best effort class corresponding to the first wavelength "λ1". The packet "v" is accompanied with the packet header (A) which identifies the perfect band guarantee class corresponding to the second wavelength A 2".

The identifier table retrieval unit 15 receives the packets "s", "t", "u" and "v" with the packet headers (A), (B), (B) and (A) and the input port informations from the packet interface unit 14. The identifier table retrieval unit 15 makes a retrieval with reference to the up-side identifier table 15-1 acting as an up-side service class specifying table, based on the packet headers (A), (B), (B) and (A) and the input port informations accompanied to the packets "s", "t", "u" and "v". Those packet headers (A), (B), (B) and (A) may comprise source port numbers of user data-gram protocol (UDP) header. Correspondences among the input port numbers, the packet headers and the identifiers are set on the up-side identifier table 15-1, wherein the service class comprises an identifier. FIG. 10 is a view illustrative of an example of service classes set on the up-side identifier table 15-1 included in the identifier table retrieval unit 15 included in the data multiplexing network 1 shown in FIG. 8.

For the packet "s", the input port number 13-1 and the packet header (A) correspond to the identifier identifying the perfect band guarantee class. Retrieval with reference to the up-side identifier table 15-1 by use of the input port number 13-1 and the packet header (A) as retrieval keys results in obtaining the identifier which identifies the perfect band guarantee class.

For the packet "t", the input port number 13-1 and the packet header (B) correspond to the identifier identifying the best effort class. Retrieval with reference to the up-side identifier table 15-1 by use of the input port number 13-1 and the packet header (B) as retrieval keys results in obtaining the identifier which identifies the best effort class.

For the packet "u", the input port number 13-2 and the packet header (B) correspond to the identifier identifying the best effort class. Retrieval with reference to the up-side identifier table 15-1 by use of the input port number 13-2 and the packet header (B) as retrieval keys results in obtaining the identifier which identifies the best effort class.

For the packet "v", the input port number 13-3 and the packet header (A) correspond to the identifier identifying the perfect band guarantee class. Retrieval with reference to the up-side identifier table 15-1 by use of the input port number 13-3 and the packet header (A) as retrieval keys results in obtaining the identifier which identifies the perfect band guarantee class.

The identifier table retrieval unit 25 receives the packets "s", "t", "u" and "v" with the packet headers (A), (B), (B) and (A) and the input port informations from the packet interface unit 24. The identifier table retrieval unit 25 makes a retrieval with reference to the up-side identifier table 25-1 acting as an up-side service class specifying table, based on the packet headers (A), (B), (B) and (A) and the input port informations accompanied to the packets 's", "t" "u" and "v". Those packet headers (A), (B), (B) and (A) may comprise source port numbers of user data-gram protocol (UDP) header. Correspondences among the input port numbers, the packet headers and the identifiers are set on the up-side identifier table 25-1, wherein the service class comprises an identifier. FIG. 11 is a view illustrative of an example of service classes set on the up-side identifier table 25-1 included in the identifier table retrieval unit 25 included in the data multiplexing network 1 shown in FIG. 8.

For the packet "s", the input port number 23-2 and the packet header (A) correspond to the identifier identifying the perfect band guarantee class. Retrieval with reference to the up-side identifier table 25-1 by use of the input port number 23-2 and the packet header (A) as retrieval keys results in obtaining the identifier which identifies the perfect band guarantee class.

For the packet "t", the input port number 23-2 and the packet header (B) correspond to the identifier identifying the best effort class. Retrieval with reference to the up-side identifier table 25-1 by use of the input port number 23-2 and the packet header (B) as retrieval keys results in obtaining the identifier which identifies the best effort class.

For the packet "u", the input port number 23-1 and the packet header (B) correspond to the identifier identifying the best effort class. Retrieval with reference to the up-side identifier table 25-1 by use of the input port number 23-1 and the packet header (B) as retrieval keys results in obtaining the identifier which identifies the best effort class.

For the packet "v", the input port number 23-3 and the packet header (A) correspond to the identifier identifying the perfect band guarantee class. Retrieval with reference to the up-side identifier table 25-1 by use of the input port number 23-3 and the packet header (A) as retrieval keys results in obtaining the identifier which identifies the perfect band guarantee class.

It is also possible as a modification that only the packet headers (A), (B), (B) and (A) accompanied to the packets "s", "t", "u" and "v" are used as retrieval keys for obtaining the identifiers which identify the corresponding service classes, without use of the input port informations accompanied to the packets "s", "t", "u" and "v".

The identifier table retrieval unit 15 further deletes or removes the input port informations from the packets "s", "t", "u" and "v", and in place adds the retrieved identifiers to the packets "s", "t", "u" and "v" before the identifier table retrieval unit 15 sends the packet with the retrieved identifiers and the packet headers to the wavelength mapping unit 16. The packet format comprises the packet with the identifier and the packet header for transmission from the identifier table retrieval unit 15 to the wavelength mapping unit 16.

The identifier table retrieval unit 25 further deletes or removes the input port informations from the packets "s", "t", "u" and "v", and in place adds the retrieved identifiers to the packets "s", "t", "u" and "v" before the identifier table retrieval unit 25 sends the packet with the retrieved identifiers and the packet headers to the wavelength mapping unit 26. The packet format comprises the packet with the identifier and the packet header for transmission from the identifier table retrieval unit 25 to the wavelength mapping unit 26.

The identifier table retrieval unit 15 receives the packets "s", "t", "u" and "v" with the identifiers and the packet headers from the wavelength mapping unit 16 through the shaper 18. The identifier table retrieval unit 15 makes a retrieval with reference to the down-side identifier table 15-2 acting as a down-side service class specifying table, based on the packet headers (A), (B), (B) and (A) accompanied to the packets "s", "t", "u" and "v", whereby the identifier table retrieval unit 15 obtains the output port information which designates the output port number. The identifier table retrieval unit 15 deletes and removes the identifiers from the packets "s", "t", "u" and "v", and in place adds the retrieved output port informations to the packets "s", "t", "u" and "v", whereby the identifier table retrieval unit sends the packets l's", "t", u and "v" with the packet readers and the retrieved output port informations to the packet interface unit 14.

The identifier table retrieval unit 25 receives the packets "S", "t", "u" and "v" with the identifiers and the packet headers from the wavelength mapping unit 26 through the shaper 28. The identifier table retrieval unit 25 makes a retrieval with reference to the down-side identifier table 25-2 acting as a down-side service class specifying table, based on the packet headers (A), (B), (B) and (A) accompanied to the packets "s", "t", "u" and "v", whereby the identifier table retrieval unit 25 obtains the output port information which designates the output port number. The identifier table retrieval unit 25 deletes and removes the identifiers from the packets "s", "t", "u" and "v", and in place adds the retrieved output port informations to the packets "s", "t" "u" and "v", whereby the identifier table retrieval unit 25 sends the packets ""t", "u" and "v" with the packet readers and the retrieved output port informations to the packet interface unit 24.

Correspondences between the output port numbers and the packet headers are set on the down-side identifier table 15-2. Also correspondences between the output port numbers and the packet headers are set on the down-side identifier table 25-2.

FIG. 12 is a view illustrative of correspondences between packet headers and output port numbers stored on the down-side identifier table 15-2 included in the identifier table retrieval unit 15 included in the wavelength multiplexer 10 shown in FIG. 8. The down-side identifier table 15-2 shown in FIG. 12 defines that the header of the packet 's" corresponds to the output port number 13-1, the header of the packet "t" corresponds to the output port number 13-1, the header of the packet "u" corresponds to the output port number 13-2, and the header of the packet "v" corresponds to the output port number 13-3.

FIG. 13 is a view illustrative of correspondences between packet headers and output port numbers stored on the down-side identifier table 25-2 included in the identifier table retrieval unit 25 included in the wavelength multiplexer 20 shown in FIG. 8. The down-side identifier table 25-2 shown in FIG. 13 defines that the header of the packet "s" corresponds to the output port number 23-2, the header of the packet "t" corresponds to the output port number 23-2, the header of the packet "u" corresponds to the output port number 23-1, and the header of the packet "v" corresponds to the output port number 23-3.

Each of the shapers 18 and 28 controls a user traffic based on a band-TCP-rate, wherein a classification is made in view of IP address, protocol, application, and uniform resource locator (URL).

The shaper 18 in the wavelength multiplexer 10 controls the band so as to ensure the service classes of the packets for making every output ports 13-1, 13-2 and 13-3 free from any traffic. The shaper 18 recognizes the output port and the service class of each packet based on the identifier accompanied to the packet, so that the shaper 18 controls a flow rate to the each output port 13-1, 13-2 or 13-3. This control by the shaper 18 allows mapping the wavelengths according to the service classes for every packets, independently from the physical connection in the side of the packet interface 11. This further contributes to realize an effective use of the line capacity of the wavelength division multiplexing network (WDM network) 30 and to efficiently transfer the TCP traffic such as WEB and FTP.

The shaper 28 in the wavelength multiplexer 20 controls the band so as to ensure the service classes of the packets for making every output ports 23-1, 23-2 and 23-3 free from any traffic. The shaper 28 recognizes the output port and the service class of each packet based on the identifier accompanied to the packet, so that the shaper 28 controls a flow rate to the each output port 23-1, 23-2 or 23-3. This control by the shaper 28 allows mapping the wavelengths according to the service classes for every packets, independently from the physical connection in the side of the packet interface 21. This further contributes to realize an effective use of the line capacity of the wavelength division multiplexing network (WDM network) 30 and to efficiently transfer the TCP traffic such as WEB and FTP.

The wavelength mapping unit 16 receives the packets "s", "t", "u" and "v" with the identifiers from the identifier table retrieval unit 15, and then the wavelength mapping unit 16 decides a wavelength to be mapped, based on each of the identifiers accompanied to the received packets "s", "t", "u" and "v", so that the wavelength mapping unit 16 maps the packets "s", "t", "u" and "v" into the decided wavelengths "λ1" and "λ2". The wavelength mapping unit 16 sends the mapped wavelengths "λ1" and "λ2" to the wavelength division multiplexing network interface unit (WDM network interface unit) 17. As shown in FIG. 7, the first wavelength "λ1" corresponds to the packets "t" and "u" with the identifier which identifies the best effort class, while the second wavelength "λ2" corresponds to the packets "s" and "v" with the identifier which identifies the perfect band guarantee class.

The wavelength mapping unit 26 receives the packets "s", "t", "u" and "v" with the identifiers from the identifier table retrieval unit 25, and then the wavelength mapping unit 26 decides a wavelength to be mapped, based on each of the identifiers accompanied to the received packets "s", "t", "u" and "v", so that the wavelength mapping unit 26 maps the packets "s", "t", "u" and "v" into the decided wavelengths "λ1" and "λ2". The wavelength mapping unit 26 sends the mapped wavelengths "λ1" and "λ2" to the wavelength division multiplexing network interface unit (WDM network interface unit) 27. As shown in FIG. 7, the first wavelength "λ1" corresponds to the packets "t" and "u" with the identifier which identifies the best effort class, while the second wavelength "λ2" corresponds to the packets "s" and "v" with the identifier which identifies the perfect band guarantee class.

The wavelength mapping unit 16 also receives the mapped wavelengths "λ1" and "λ2" from the wavelength division multiplexing network interface unit (WDM network interface unit) 17, and then the wavelength mapping unit 16 fetches the packets "S", "t", "U" and "v" from the received wavelengths "λ1" and "λ2". The wavelength mapping unit 16 adds the identifiers to the fetched packets "s", "t", "u" and "v" and sends the fetched packets "s", "t", "U" and "v" with the identifiers to the identifier table retrieval unit 15 as shown in the packet format 50 of FIG. 9.

The wavelength mapping unit 26 also receives the mapped wavelengths "λ1" and "λ2" from the wavelength division multiplexing network interface unit (WDM network interface unit) 27, and then the wavelength mapping unit 26 fetches the packets "s", "t", "u" and "v" from the received wavelengths "λ1" and "λ2". The wavelength mapping unit 26 adds the identifiers to the fetched packets "S", "t", "u" and "v" and sends the fetched packets "s", "t", "u" and "v" with the identifiers to the identifier table retrieval unit 25 as shown in the packet format 50 of FIG. 9.

The wavelength division multiplexing network interface unit (WDM network interface unit) 17 receives the mapped wavelengths "λ1" and "λ2" from the wavelength mapping unit 16, and then multiplexes the mapped wavelengths "λ1" and "λ2" into a single wavelength. The wavelength division multiplexing network interface unit (WDM network interface unit) 17 sends the multiplexed single wavelength through the wavelength division multiplexing network interface (WDM network interface) 12 to the wavelength division multiplexing network (WDM network) 30. For example, the first wavelength "λ1" corresponds to the packets "u" and "t" with the packet header (B) which identifies the best effort class, while the second wavelength "λ2" corresponds to the packets s" and "v" with the packet header (A) which identifies the perfect band guarantee class.

The wavelength division multiplexing network interface unit (WDM network interface unit) 27 receives the mapped wavelengths "λ1" and "λ2" from the wavelength mapping unit 26, and then multiplexes the mapped wavelengths "λ1" and "λ2" into a single wavelength. The wavelength division multiplexing network interface unit (WDM network interface unit) 27 sends the multiplexed single wavelength through the wavelength division multiplexing network interface (WDM network interface) 22 to the wavelength division multiplexing network (WDM network) 30. For example, the first wavelength "λ1" corresponds to the packets "u" and "t" with the packet header (B) which identifies the best effort class, while the second wavelength "λ2" corresponds to the packets "s" and "v" with the packet header (A) which identifies the perfect band guarantee class.

The wavelength division multiplexing network interface unit (WDM network interface unit) 17 receives the multiplexed wavelength through the wavelength division multiplexing network interface (WDM network interface) 12 from the wavelength division multiplexing network (WDM network) 30. The wavelength division multiplexing network interface unit (WDM network interface unit) 17 demultiplexes the multiplexed wavelength into the first and second wavelengths "λ1" and "λ2". The wavelength division multiplexing network interface unit (WDM network interface unit) 17 sends the demultiplexed first and second wavelengths "λ1" and "λ2" to the wavelength mapping unit 16. For example, the first wavelength "λ1" corresponds to the packets "u" and "t" with the packet header (B) which identifies the best effort class, while the second wavelength "λ2" corresponds to the packets "s" and "v" with the packet header (A) which identifies the perfect band guarantee class.

The wavelength division multiplexing network interface unit (WDM network interface unit) 27 receives the multiplexed wavelength through the wavelength division multiplexing network interface (WDM network interface) 22 from the wavelength division multiplexing network (WDM network) 30. The wavelength division multiplexing network interface unit (WDM network interface unit) 27 demultiplexes the multiplexed wavelength into the first and second wavelengths "λ1" and "λ2". The wavelength division multiplexing network interface unit (WDM network interface unit) 27 sends the demultiplexed first and second wavelengths "λ1" and "λ2" to the wavelength mapping unit 26. For example, the first wavelength "λ1" corresponds to the packets "u" and "t"

with the packet header (B) which identifies the best effort class, while the second wavelength "λ2" corresponds to the packets "s" and "v" with the packet header (A) which identifies the perfect band guarantee class.

As described above with reference to FIG. 9, the wavelength multiplexer 10 includes a first wavelength multiplexing function block for processing the up-side packets for transmission through the wavelength division multiplexing network (WDM network) 30 to the wavelength multiplexer 20, and a second wavelength multiplexing function block for processing the down-side packets as received through the wavelength division multiplexing network (WDM network) 30 from the wavelength multiplexer 20.

As described above with reference to FIG. 9, the wavelength multiplexer 20 includes a first wavelength multiplexing function block for processing the up-side packets for transmission through the wavelength division multiplexing network (WDM network) 30 to the wavelength multiplexer 10, and a second wavelength multiplexing function block for processing the down-side packets as received through the wavelength division multiplexing network (WDM network) 30 from the wavelength multiplexer 10.

The first wavelength multiplexing function block of the wavelength multiplexer 10 includes a plurality of ports 13-1, 13-2 and 13-3 for receiving the packets "s", "t", "u" and "v" respectively, an up-side packet interface sub-unit included in the packet interface unit 14 for receiving the packets "s", "t", "u" and "v" from the plurality of ports 13-1, 13-2 and 13-3, an up-side identifier table retrieval sub-unit including the up-side identifier table 15-1 and being included in the identifier table retrieval unit 15 for specifying or designating the service classes, to which the received packets "s", "t", "u" and "v" belong respectively, an up-side shaping sub-unit included in the shaper 18, an up-side wavelength mapping sub-unit included in the wavelength mapping unit 16 for mapping the packets "s", "t", "u" and "v" into the wavelengths which correspond to the service classes specified or designated by the up-side identifier table retrieval sub-unit, and an up-side wavelength division multiplexing network interface sub-unit included in the wavelength division multiplexing network interface unit (WDM network interface unit) 17 for multiplexing the wavelengths mapped by the up-side wavelength mapping sub-unit.

The second wavelength multiplexing function block of the wavelength multiplexer 10 includes a down-side wavelength division multiplexing network interface sub-unit included in the wavelength division multiplexing network interface unit (WDM network interface unit) 17 for demultiplexing the multiplexed wavelength received through the wavelength division multiplexing network interface (WDM network interface) 12 from the wavelength division multiplexing network (WDM network) 30, a down-side shaping sub-unit included in the shaper 18, a down-side wavelength mapping sub-unit included in the wavelength mapping unit 16 for receiving the demultiplexed wavelengths from the down-side wavelength division multiplexing network interface sub-unit and for fetching the packets "s", "t", "u" and "v" from the received wavelengths, a down-side identifier table retrieval sub-unit including the down-side identifier table 15-1 and being included in the identifier table retrieval unit 15 for specifying or designating output ports, from which the received packets are to be outputted, a down-side packet interface sub-unit included in the packet interface unit 14 for receiving the packets "s", "t", "u" and "v" from the down-side identifier table retrieval sub-unit and transmitting the packets "s", "t", "u" and "v" to the plurality of ports 13-1, 13-2 and 13-3, and the plurality of ports 13-1, 13-2 and 13-3 for receiving the packets "s", "t", "u" and "v" from the packet interface unit 14 and outputting the packets The first wavelength multiplexing function block of the wavelength multiplexer 20 includes a plurality of ports 23-1, 23-2 and 23-3 for receiving the packets "s", "t", "u" and "v" respectively, an up-side packet interface sub-unit included in the packet interface unit 24 for receiving the packets "s", "t", "u" and "v" from the plurality of ports 23-1, 23-2 and 23-3, an up-side identifier table retrieval sub-unit including the up-side identifier table 25-1 and being included in the identifier table retrieval unit 25 for specifying or designating the service classes, to which the received packets "s", "t", "u" and "v" belong respectively, an up-side shaping sub-unit included in the shaper 28, an up-side wavelength mapping sub-unit included in the wavelength mapping unit 26 for mapping the packets "s", "t", "u" and "v" into the wavelengths which correspond to the service classes specified or designated by the up-side identifier table retrieval sub-unit, and an up-side wavelength division multiplexing network interface sub-unit included in the wavelength division multiplexing network interface unit (WDM network interface unit) 27 for multiplexing the wavelengths mapped by the up-side wavelength mapping sub-unit.

The second wavelength multiplexing function block of the wavelength multiplexer 20 includes a down-side wavelength division multiplexing network interface sub-unit included in the wavelength division multiplexing network interface unit (WDM network interface unit) 27 for demultiplexing the multiplexed wavelength received through the wavelength division multiplexing network interface (WDM network interface) 22 from the wavelength division multiplexing network (WDM network) 30, a down-side shaping sub-unit included in the shaper 28, a down-side wavelength mapping sub-unit included in the wavelength mapping unit 26 for receiving the demultiplexed wavelengths from the down-side wavelength division multiplexing network interface sub-unit and for fetching the packets "s", "t", "u" and "v" from the received wavelengths, a down-side identifier table retrieval sub-unit including the down-side identifier table 25-1 and being included in the identifier table retrieval unit 25 for specifying or designating output ports, from which the received packets are to be outputted, a down-side packet interface sub-unit included in the packet interface unit 24 for receiving the packets "s", "t", "u" and "v" from the down-side identifier table retrieval sub-unit and transmitting the packets "s", "t", "u" and "v" to the plurality of ports 23-1, 23-2 and 23-3, and the plurality of ports 23-1, 23-2 and 23-3 for receiving the packets "s", "t", "u" and "v" from the packet interface unit 24 and outputting the packets "s", "t", "u" and "v".

The wavelength division multiplexing network (WDM network) 30 comprises a single optical fiber cable for data transmissions at plural different wavelengths through the wavelength division multiplexing, wherein the multiplexed wavelength is transmitted through the single optical fiber. The wavelength division multiplexing network (WDM network) 30 includes physically independent two paths for the first wavelength "λ1" corresponding to the best effort class and the second wavelength "λ2" corresponding to the perfect band guarantee class. The best effort class does not guarantee the quality of service. The perfect band guarantee class guarantees the quality of service.

The following descriptions will focus on operations of the data multiplexing network 1 with reference again to FIGS. 8 and 9.

First, the transmission operation of the data multiplexing network 1 for data transmission through the wavelength division multiplexing network (WDM network) 30 will be described prior to the descriptions of the receiving operation of the data multiplexing network 1.

Respective service classes, to which the packets "s", "t", "u" and "v" belong, with correspondences to the ports 13-1, 13-2 and 13-3 and the packet headers (A) and (B) are stored on the up-side identifier table 15-1 included in the identifier table retrieval unit 15 as shown in FIG. 10. Respective output port numbers with the and the packet headers (A) and (B) are stored on the down-side identifier table 15-2 included in the identifier table retrieval unit 15 as shown in FIG. 12. Respective wavelengths "λ1" and "λ2" with correspondences to the respective service classes are pre-determined as shown in FIG. 7. The port 13-1 is allocated for the packets "s" and "t". The port 13-2 is allocated for the packet "u". The port 13-3 is allocated for the packet "v".

Respective service classes, to which the packets "S", "t", "u" and "v" belong, with correspondences to the ports 23-2, 23-1 and 23-3 and the packet headers (A) and (B) are stored on the up-side identifier table 25-1 included in the identifier table retrieval unit 25 as shown in FIG. 11. Respective output port numbers with the and the packet headers (A) and (B) are stored on the down-side identifier table 25-2 included in the identifier table retrieval unit 25 as shown in FIG. 13. Respective wavelengths "λ1" and "λ2" with correspondences to the respective service classes are pre-determined as shown in FIG. 7. The port 23-2 is allocated for the packets "S" and "t". The port 23-1 is allocated for the packet "u". The port 23-3 is allocated for the packet "v".

The identifier table retrieval unit 15 defines as follows. For the packet "s", the input port number 13-1 and the packet header (A) correspond to the identifier identifying the perfect band guarantee class. For the packet "t", the input port number 13-1 and the packet header (B) correspond to the identifier identifying the best effort class. For the packet "u", the input port number 13-2 and the packet header (B) correspond to the identifier identifying the best effort class. For the packet "v", the input port number 13-3 and the packet header (A) correspond to the identifier identifying the perfect band guarantee class.

The identifier table retrieval unit 25 defines as follows. For the packet "s", the input port number 23-2 and the packet header (A) correspond to the identifier identifying the perfect band guarantee class. For the packet "t", the input port number 23-2 and the packet header (B) correspond to the identifier identifying the best effort class. For the packet "u", the input port number 23-1 and the packet header (B) correspond to the identifier identifying the best effort class. For the packet "v", the input port number 23-3 and the packet header (A) correspond to the identifier identifying the perfect band guarantee class.

The ports 13-1, 13-2 and 13-3 receive the packets "s", "t", "u" and "v" respectively which have been transmitted through the packet interface 11, and then transmits the received packets "s", "t", "u" and "v" to the packet interface unit 14.

The ports 23-1, 23-2 and 23-3 receive the packets "s", t", "u" and "v" respectively which have been transmitted through the packet interface 21, and then transmits the received packets "s", "t", "u" and "v" to the packet interface unit 24.

The packet interface unit 14 adds the input port informations to the received packets "s", "t", "u" and "v", wherein the input port informations identify the ports 13-1, 13-2 and 13-3, at which the packets "s", "t", "u" and "v" have been received. The packet interface unit 14 sends the packets "s", "t", "u" and "v" with the input port informations to the identifier table retrieval unit 15. The packets "s" and "t" are accompanied with the input port information identifying the port 13-1. The packet "u" is accompanied with the input port information identifying the port 13-2. The packet "v" is accompanied with the input port information identifying the port 13-3.

The packet interface unit 24 adds the input port informations to the received packets "s", "t", "u" and "v", wherein the input port informations identify the ports 23-2, 23-1 and 23-3, at which the packets "s", "t", "u" and "v" have been received. The packet interface unit 24 sends the packets "s", "t", "u" and "v" with the input port informations to the identifier table retrieval unit 25. The packets "s" and "t" are accompanied with the input port information identifying the port 23-2. The packet "u" is accompanied with the input port information identifying the port 23-1. The packet "v" is accompanied with the input port information identifying the port 23-3.

The identifier table retrieval unit 15 receives the packets "s", "t", "u" and "v" with the input port informations and the packet headers, and fetches the input port informations and the packet headers from the packets "s", "t", "u" and "v". The identifier table retrieval unit 15 makes a retrieval with reference to the up-side identifier table 15-1 by use of the fetched input port informations and the fetched packet headers as retrieval keys, and obtains the identifiers identify the service classes, to which the packets "s", "t", "u" and "v" belong. The identifier table retrieval unit 15 deletes and removes the input port informations from the packets "s", "t", "u" and "v", and in place adds the retrieved identifiers to the packets "s", "t", "u" and "v". The identifier table retrieval unit 15 sends the packets "s", "t", "u" and "v" with the retrieved identifiers and the packet headers to the wavelength mapping unit 16. The up-side identifier table 15-1 defines that the best effort class corresponds to the packets "t" and "u", while the perfect band guarantee class corresponds to the packets "s" and "v".

The identifier table retrieval unit 25 receives the packets "s", "t", "u" and "v" with the input port informations and the packet headers, and fetches the input port informations and the packet headers from the packets "s", "t", "u" and "v". The identifier table retrieval unit 25 makes a retrieval with reference to the up-side identifier table 25-1 by use of the fetched input port informations and the fetched packet headers as retrieval keys, and obtains the identifiers identify the service classes, to which the packets "s", "t", "u" and "v" belong. The identifier table retrieval unit 25 deletes and removes the input port informations from the packets "s", "t", "u" and "v", and in place adds the retrieved identifiers to the packets "s", "t", "u" and "v". The identifier table retrieval unit 25 sends the packets "s", "t", "u" and "v" with the retrieved identifiers and the packet headers to the wavelength mapping unit 26. The up-side identifier table 25-1 defines that the best effort class corresponds to the packets "t" and "u", while the perfect band guarantee class corresponds to the packets "s" and "v".

The wavelength mapping unit 16 receives the packets "s", "t", "u" and "v" with the retrieved identifiers, and fetches the retrieved identifiers from the packets "s t", line "u" and "v", and decides respective service classes based on the retrieved identifiers. The wavelength mapping unit 16 maps the packets "s", "t", "u" and "v" into the wavelengths corresponding to the decided service classes. Since the packets "t" and "u" are accompanied with the identifier which identifies the best effort class, then the wavelength mapping unit 16 maps the packets "t" and "u" to the first wavelength "λ1" which corresponds to the best effort class. Since the packets "s" and "v" are accompanied with the identifier which identifies the perfect band guarantee class, then the wavelength mapping unit 16 maps the packets "s" and "v" to the second wavelength "λ2" which corresponds to the perfect band guarantee class. The wavelength mapping unit 16 sends the mapped first and second wavelengths "λ1" and "λ2" to the wavelength division multiplexing network interface unit (WDM network interface unit) 17.

The wavelength mapping unit 26 receives the packets "s", "t", "u" and "v" with the retrieved identifiers, and fetches the retrieved identifiers from the packets "s", "t", "u" and "v", and decides respective service classes based on the retrieved identifiers. The wavelength mapping unit 26 maps the packets "s", "t", "u" and "v" into the wavelengths corresponding to the decided service classes. Since the packets "t" and "u" are accompanied with the identifier which identifies the best effort class, then the wavelength mapping unit 26 maps the packets "t" and "u" to the first wavelength "λ1" which corresponds to the best effort class. Since the packets "s" and "v" are accompanied with the identifier which identifies the perfect band guarantee class, then the wavelength mapping unit 26 maps the packets "s" and "v" to the second wavelength "λ2" which corresponds to the perfect band guarantee class. The wavelength mapping unit 26 sends the mapped first and second wavelengths "λ1" and "λ2" to the wavelength division multiplexing network interface unit (WDM network interface unit) 27.

The wavelength division multiplexing network interface unit (WDM network interface unit) 17 multiplexes the received first and second wavelengths "λ1" and "λ2" which correspond to the best effort class and the perfect band guarantee class, respectively. The wavelength division multiplexing network interface unit (WDM network interface unit) 17 transits the packets "t" and "u" at the first wavelength "λ1" corresponding to the best effort class, and the packets "s" and "v" at the second wavelength "λ2" corresponding to the perfect band guarantee class.

The wavelength division multiplexing network interface unit (WDM network interface unit) 27 multiplexes the received first and second wavelengths "λ1" and "λ2" which correspond to the best effort class and the perfect band guarantee class, respectively. The wavelength division multiplexing network interface unit (WDM network interface unit) 27 transits the packets "t" and "u" at the first wavelength "λ1" corresponding to the best effort class, and the packets "s" and "v" at the second is wavelength "λ2" corresponding to the perfect band guarantee class.

The receiving operation of the data multiplexing network 1 will subsequently be described.

The wavelength division multiplexing network interface unit (WDM network interface unit) 17 receives the multiplexed wavelength through the wavelength division multiplexing network interface (WDM network interface) 12 from the wavelength division multiplexing network (WDM network) 30. The wavelength division multiplexing network interface unit (WDM network interface unit) 17 demultiplexes the multiplexed wavelength into the first and second wavelengths "λ1" and "λ2". The wavelength division multiplexing network interface unit (WDM network interface unit) 17 sends the first and second wavelengths "λ1" and "λ2" to the wavelength mapping unit 16.

The wavelength division multiplexing network interface unit (WDM network interface unit) 27 receives the multiplexed wavelength through the wavelength division multiplexing network interface (WDM network interface) 22 from the wavelength division multiplexing network (WDM network) 30. The wavelength division multiplexing network interface unit (WDM network interface unit) 27 demultiplexes the multiplexed wavelength into the first and second wavelengths "λ1" and "λ2". The wavelength division multiplexing network interface unit (WDM network interface unit) 27 sends the first and second wavelengths "λ1" and "λ2" to the wavelength mapping unit 26.

The wavelength mapping unit 16 receives the first and second wavelengths "λ1" and "λ2" and fetches the packets "s", "t", "u" and "v" from the received first and second wavelengths "λ1" and "λ2". The wavelength mapping unit 16 adds the fetched packets "s", "t", "u" and "v" with the identifies which correspond to the first and second wavelengths "λ1" and "λ2" allocated to the best effort class and the perfect band guarantee class. The wavelength mapping unit 16 sends the packets "s", "t", "u" and "v" with the identifies to the identifier table retrieval unit 15.

The wavelength mapping unit 26 receives the first and second wavelengths "λ1" and "λ2" and fetches the packets "s", "t", "u" and "v" from the received first and second wavelengths "λ1" and "λ2". The wavelength mapping unit 26 adds the fetched packets "s", "t", "u" and "v" with the identifies which correspond to the first and second wavelengths "λ1" and "λ2" allocated to the best effort class and the perfect band guarantee class. The wavelength mapping unit 26 sends the packets "s", "t", "u" and "v" with the identifies to the identifier table retrieval unit 25.

The identifier table retrieval unit 15 receives the packets "s", "t", "u" and "v" with the identifies from the wavelength mapping unit 16, and fetches the identifiers from the packets "s", "t", "u" and "v", so that the identifier table retrieval unit 15 makes a retrieval with reference to the down-side identifier table 15-2 by use of the fetched identifiers as retrieval keys, whereby the identifier table retrieval unit 15 obtains the output port informations from the down-side identifier table 15-2, wherein the output port informations identify the output ports, from which the packets "s", "t", "u" and "v" will be outputted. The identifier table retrieval unit 15 deletes or removes the identifiers from the packets "s", "t", "u" and "v", and in place adds the retrieved output port informations to the packets "s", "t", "u" and "v". The identifier table retrieval unit 15 sends the packets "s", "t", "u" and "v" with the retrieved output port informations to the packet interface unit 14.

The identifier table retrieval unit 25 receives the packets "s", "t", "u" and "v" with the identifies from the wavelength mapping unit 26, and fetches the identifiers from the packets "s", "t", "u" and "v", so that the identifier table retrieval unit 25 makes a retrieval with reference to the down-side identifier table 25-2 by use of the fetched identifiers as retrieval keys, whereby the identifier table retrieval unit 25 obtains the output port informations from the down-side identifier table 25-2, wherein the output port informations identify the output ports, from which the packets "s", "t", "u" and "v" will be outputted. The identifier table retrieval unit 25 deletes or removes the identifiers from the packets "s", "t", "u" and "v", and in place adds the retrieved output port informations to the packets "s", "t", "u" and "v". The identifier table retrieval unit 25 sends the packets "s", "t", "u" and "v" with the retrieved output port informations to the packet interface unit 24.

The down-side identifier table 15-2 included in the wavelength multiplexer 10 defines that the headers of the packets "s" and "t" correspond to the output port number 13-1, and the header of the packet "u" corresponds to the output port number 13-2, and the header of the packet "v" corresponds to the output port number 13-3.

The down-side identifier table 25-2 included in the wavelength multiplexer 20 defines that the headers of the packets "s" and "t" correspond to the output port number 23-2, and the header of the packet "u" corresponds to the output port number 23-1, and the header of the packet "v" corresponds to the output port number 23-3.

The identifier table retrieval unit 15 adds the output port information identifying the port 13-1 in the wavelength multiplexer 10 to the packets "s" and "t". The identifier table retrieval unit 15 also adds the output port information identifying the port 13-3 in the wavelength multiplexer 10 to the packet "v". The identifier table retrieval unit 15 also adds the output port information identifying the port 13-2 in the wavelength multiplexer 10 to the packet "u".

The identifier table retrieval unit 25 adds the output port information identifying the port 23-2 in the wavelength multiplexer 20 to the packets "s" and "t". The identifier table retrieval unit 25 also adds the output port information identifying the port 23-1 in the wavelength multiplexer 20 to the packet "u". The identifier table retrieval unit 25 also adds the output port information identifying the port 23-3 in the wavelength multiplexer 20 to the packet "v".

The packet interface unit 14 receives the packets "s", "t", "u" and "v" with the output port informations from the identifier table retrieval unit 15, and fetches the output port informations from the packets "s", "t", "u" and "v", so that the packet interface unit 14 sends the packets "s", "t", "u" and "v" to the ports 13-1, 13-2 and 13-3 designated by the fetched output port informations. Since the packets "s" and "t" are accompanied with the output port information identifying the port 13-1, then the packet interface unit 14 sends the packets "s" and "t" to the port 13-1. Since the packet "u" is accompanied with the output port information identifying the port 13-2, then the packet interface unit 14 sends the packet "u" to the port 13-2. Since the packet "v" is accompanied with the output port information identifying the port 13-3, then the packet interface unit 14 sends the packet "v" to the port 13-3.

The packet interface unit 24 receives the packets "s", "t", "u" and "v" with the output port informations from the identifier table retrieval unit 25, and fetches the output port informations from the packets "s", "t", "u" and "v", so that the packet interface unit 24 sends the packets "s", "t", "u" and "v" to the ports 23-1, 23-3 and 23-2 designated by the fetched output port informations. Since the packets "s" and "t" are accompanied with the output port information identifying the port 23-2, then the packet interface unit 24 sends the packets "s" and "t" to the port 23-2. Since the packet "u" is accompanied with the output port information identifying the port 23-1, then the packet interface unit 24 sends the packet "u" to the port 23-1. Since the packet "v" is accompanied with the output port information identifying the port 23-3, then the packet interface unit 24 sends the packet "v" to the port 23-3.

The packets "s", "t", "u" and "v" received at the ports 13-1, 13-2 and 13-3 are further transmitted through the packet interface 11 to the general line 40. The packets "s", "t", "u" and "v" received at the ports 23-1, 23-3 and 23-2 are further transmitted through the packet interface 21 to the general line 40.

In accordance with the novel data multiplexing network 1 of this embodiment, different wavelengths are allocated to every different plural service classes, to which plural packets belong, wherein the different wavelengths are multiplexed through the wavelength division multiplexing for transmissions through the wavelength division multiplexing network (WDM network) 30 which comprises a single optical fiber. Allocations of the different wavelengths to every different plural service classes prevent any substantive interference between the different service classes.

The wavelength division multiplexing of the different wavelengths allocated to every different plural service classes allows increasing the service class bands without increasing the number of the optical fibers.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A data multiplexing network system including:
a wavelength division multiplexing network;
a first wavelength multiplexing function unit for setting a plurality of different wavelengths which correspond to a plurality of different service classes, respectively, and for mapping each of a plurality of packets entering the wavelength division multiplexing network into a correspondent-wavelength corresponding to a particular one of the plurality of different service classes to which said packet belongs, and for multiplexing said correspondent-wavelengths for said plurality of different service classes for a data transmission through said wavelength division multiplexing network; and
a second wavelength multiplexing function unit for receiving each correspondent-wavelength and for fetching a packet therefrom,
wherein said first wavelength multiplexing function unit further includes:
a plurality of ports for receiving said plurality of packets into the wavelength division multiplexing network;
a first packet interface unit for receiving said plurality of packets from said plurality of ports;
a first service class specifying unit for receiving said plurality of packets from said first packet interface unit and for specifying the service class to which each of said plurality of packets belongs;
a first wavelength mapping unit for receiving said plurality of packets from said first service class specifying unit and for mapping each of said plurality of packets at a correspondent-wavelength corresponding to the specified service class; and
a first wavelength division multiplexing network interface for receiving said correspondent-wavelengths from said first wavelength mapping unit and for multiplexing said correspondent-wavelengths; and
wherein each of said plurality of packets includes packet identifying information which identifies said packet,
wherein said first service class specifying unit further includes: a service class-correspondent table for defining correspondences between said service classes and said packet identifying information, and
wherein said first service class specifying unit uses said service class-correspondent table, based on said packet identifying information, so as to specify the service class corresponding to said packet identifying information.

2. The data multiplexing network system as claimed in claim 1, wherein said second wavelength multiplexing function unit further includes:
a second wavelength division multiplexing network interface for demultiplexing a multiplexed signal transmitted through said wavelength division multiplexing network into said correspondent-wavelengths;
a second wavelength mapping unit for receiving said correspondent-wavelengths from said second wavelength division multiplexing network interface and for fetching said packets from said correspondent-wavelengths;

a second service class specifying unit for receiving said packets from said second wavelength mapping unit and for specifying an appropriate output port for each of said packets, and for adding output port information to each packet; and a second packet interface unit for receiving each packet with said output port information and for sending said packet to the one of said plurality of ports identified by said output port information.

3. The data multiplexing network system as claimed in claim 2, wherein said first service class specifying unit adds the packet identifying information to each packet, and wherein said second service class specifying unit also specifies said output port based on said output port information of each packet.

4. The data multiplexing network system as claimed in claim 2, wherein said second service class specifying unit also specifies said output port based on the packet identifying information included in each packet.

5. The data multiplexing network system as claimed in claim 4, wherein said packet identifying information comprises a packet header included in each packet.

6. The data multiplexing network system as claimed in claim 1, wherein said first packet interface unit adds input port information to each of said plurality of packets as received from said plurality of ports, said input port information identifying the port through which said packet has been received, wherein said first service class specifying unit further includes: a service class-correspondent table for defining correspondences between said service classes and said plurality of ports, and wherein said first service class specifying unit uses said service class-correspondent table, based on said input port information, so as to specify the service class corresponding to each port.

7. The data multiplexing network system as claimed in claim 1, wherein said plurality of different service classes include a best effort class and a perfect band guarantee class.

8. The data multiplexing network system as claimed in claim 1, wherein at least one of said first and second wavelength multiplexing function units further includes a shaper for controlling packet traffics in a plurality of wavelength bands.

9. A wavelength multiplexer including:

a first wavelength multiplexing function unit for setting a plurality of different wavelengths which correspond to a plurality of different service classes, respectively, and for mapping each of a plurality of packets entering a wavelength division multiplexing network into a correspondent-wavelength which corresponds to a particular one of the plurality of different service classes to which said packet belongs, and for multiplexing said correspondent-wavelengths for said plurality of different service classes for a data transmission through said wavelength division multiplexing network, wherein said first wavelength multiplexing function unit further includes:

a plurality of ports for receiving said plurality of packets into the wavelength division multiplexing network;

a first packet interface unit for receiving said plurality of packets from said plurality of ports;

a first service class specifying unit for receiving said plurality of packets from said first packet interface unit and for specifying the service class to which each of said plurality of packets belongs;

a first wavelength mapping unit for receiving said plurality of packets from said first service class specifying unit and for mapping each of said plurality of packets at a correspondent-wavelength corresponding to the specified service class; and a first wavelength division multiplexing network interface for receiving said correspondent-wavelengths from said first wavelength mapping unit and for multiplexing said correspondent-wavelengths, wherein each of said plurality of packets includes packet identifying information which identifies said packet, wherein said first service class specifying unit further includes: a service class-correspondent table for defining correspondences between said service classes and said packet identifying information, and wherein said first service class specifying unit uses said service class-correspondent table, based on said packet identifying information service class corresponding to said packet identifying information.

10. The wavelength multiplexer as claimed in claim 9, further including a second wavelength multiplexing function unit for receiving each correspondent-wavelength and for fetching a packet therefrom.

11. The wavelength multiplexer as claimed in claim 10, wherein said second wavelength multiplexing function unit further includes:

a second wavelength division multiplexing network interface for demultiplexing a multiplexed signal transmitted through said wavelength division multiplexing network into said correspondent-wavelengths;

a second wavelength mapping unit for receiving said correspondent-wavelengths from said second wavelength division multiplexing network interface and for fetching said packets from said correspondent-wavelengths;

a second service class specifying unit for receiving said packets from said second wavelength mapping unit and for specifying an appropriate output port for each of said packets, and for adding output port information to each packet; and a second packet interface unit for receiving each packet with said output port information and for sending said packet to the one of said plurality of ports identified by said output port information.

12. The wavelength multiplexer as claimed in claim 11, wherein said first service class specifying unit adds the packet identifying information to each packet, and wherein said second service class specifying unit also specifies said output port based on said output port information of each packet.

13. The wavelength multiplexer as claimed in claim 11, wherein said second service class specifying unit also specifies said output port based on the packet identifying information included in each packet.

14. The wavelength multiplexer as claimed in claim 13, wherein said packet identifying information comprises a packet header included in each packet.

15. The wavelength multiplexer as claimed in claim 9, wherein said first packet interface unit adds input port information to each of said plurality of packets as received from said plurality of ports, said input port information identifying the port through which said packet has been received, wherein said first service class specifying unit further includes: a service class-correspondent table for defining correspondences between said service classes and said plurality of ports, and wherein said first service class specifying unit uses said service class-correspondent table, based on said input port information, so as to specify the service class corresponding to each port.

16. The wavelength multiplexer as claimed in claim 9, wherein said plurality of different service classes include a best effort class and a perfect band guarantee class.

17. The wavelength multiplexer as claimed in claim 9, wherein at least one of said first and second wavelength multiplexing function units further includes a shaper for controlling packet traffics in a plurality of wavelength bands.

18. A data multiplexing transmission method including:

setting a plurality of different wavelengths which correspond to a plurality of different service classes, respectively;

mapping each of a plurality of packets entering a wavelength division multiplexing network into a correspondent-wavelength which corresponds to a particular one of the plurality of different service classes to which said packet belongs; and multiplexing said correspondent-wavelengths for said plurality of different service classes for a data transmission through said wavelength division multiplexing network, wherein each of said plurality of packets includes packet identifying information which identifies said packet, and wherein a retrieval is made with reference to a service class-correspondent table defining correspondences between said service classes and said packet identifying information, based on said packet identifying information, so as to specify the service class corresponding to said packet identifying information.

19. The data multiplexing transmission method as claimed in claim 18, further including:

receiving said correspondent-wavelength into said wavelength division multiplexing network; and fetching a packet from said correspondent-wavelength.

20. The data multiplexing transmission method as claimed in claim 19, further including the steps of:

demultiplexing a multiplexed signal transmitted through said wavelength division multiplexing network into said correspondent-wavelengths for fetching said packets from said correspondent-wavelengths;

specifying an output port for each of said packets;

adding the specified output port information to each packet; and sending each packet to an identified one of said plurality of ports, identified by said output port information.

21. The data multiplexing transmission method as claimed in claim 20, wherein the packet identifying information is added to each packet, and wherein said output port is specified based on said output port information of each packet.

22. The data multiplexing transmission method as claimed in claim 20, wherein said output port is also specified based on the packet identifying information included in each packet.

23. The data multiplexing transmission method as claimed in claim 22, wherein said packet identifying information comprises a packet header included in each packet.

24. The data multiplexing transmission method as claimed in claim 18, wherein input port information is added to each of said plurality of packets as received from a plurality of ports, said input port information identifying the port through which said packet has been received, and wherein a retrieval is made with reference to a service class-correspondent table for defining correspondences between said service classes and said plurality of ports, based on said input port information, so as to specify the service class corresponding to each port identified by said input port information.

25. The data multiplexing transmission method as claimed in claim 18, wherein said plurality of different service classes include a best effort class and a perfect band guarantee class.

* * * * *